(12) United States Patent
Mudd et al.

(10) Patent No.: US 10,782,710 B2
(45) Date of Patent: Sep. 22, 2020

(54) FLOW CONTROL SYSTEM, METHOD, AND APPARATUS

(71) Applicant: Reno Technologies, Inc., Wilmington, DE (US)

(72) Inventors: Daniel T. Mudd, Reno, NV (US); Marshall B. Grill, Reno, NV (US); Norman L. Batchelor, II, Sparks, NV (US)

(73) Assignee: ICHOR SYSTEMS, INC.

( * ) Notice: Subject to any disclaimer, the term of this patent is extended or adjusted under 35 U.S.C. 154(b) by 0 days.

(21) Appl. No.: 16/383,844

(22) Filed: Apr. 15, 2019

(65) Prior Publication Data

US 2019/0243393 A1 Aug. 8, 2019

Related U.S. Application Data

(63) Continuation of application No. 15/638,742, filed on Jun. 30, 2017, now Pat. No. 10,303,189.

(60) Provisional application No. 62/357,113, filed on Jun. 30, 2016.

(51) Int. Cl.
| | | |
|---|---|---|
| *G05D 7/06* | (2006.01) | |
| *G01F 1/684* | (2006.01) | |
| *F16K 27/00* | (2006.01) | |
| *G01F 15/00* | (2006.01) | |
| *H01L 21/205* | (2006.01) | |

(52) U.S. Cl.
CPC ......... *G05D 7/0682* (2013.01); *F16K 27/003* (2013.01); *G01F 1/6842* (2013.01); *G01F 1/6847* (2013.01); *G01F 15/002* (2013.01); *G05D 7/0635* (2013.01); *H01L 21/205* (2013.01)

(58) Field of Classification Search
USPC .......................................................... 73/1.16
See application file for complete search history.

(56) References Cited

U.S. PATENT DOCUMENTS

| | | |
|---|---|---|
| 2,666,297 A | 1/1954 | Skousgaard |
| 3,271,994 A | 9/1966 | Fournier et al. |
| 3,335,748 A | 8/1967 | Klemm et al. |
| 3,453,861 A | 7/1969 | Levasseur |
| 3,491,946 A | 1/1970 | Muller |
| 3,504,692 A | 4/1970 | Goldstein |
| 3,559,482 A | 2/1971 | Baker et al. |
| 3,570,807 A | 3/1971 | Sturman et al. |

(Continued)

FOREIGN PATENT DOCUMENTS

| | | |
|---|---|---|
| CN | 1816733 | 8/2006 |
| CN | 102354228 | 2/2012 |

(Continued)

*Primary Examiner* — Clayton E. LaBalle
*Assistant Examiner* — Warren K Fenwick
(74) *Attorney, Agent, or Firm* — The Belles Group, P.C.

(57) ABSTRACT

A mass flow control apparatus having a monolithic base. The monolithic base has a gas inlet, a gas outlet, a first flow component mounting region, a second flow component mounting region, and a third flow component mounting region. The first flow component mounting region has a first inlet port and a first outlet port, the first inlet port being fluidly coupled to the gas inlet of the monolithic base. The second flow component mounting region has a second inlet port, a second outlet port, and a first auxiliary port.

20 Claims, 24 Drawing Sheets

(56) References Cited

U.S. PATENT DOCUMENTS

| | | |
|---|---|---|
| 3,807,456 A | 4/1974 | Colletti |
| 3,814,541 A | 6/1974 | Dent et al. |
| 3,841,520 A | 10/1974 | Bryant et al. |
| 3,910,113 A | 10/1975 | Brown |
| 4,015,626 A | 4/1977 | Thordarson |
| 4,096,746 A | 6/1978 | Wilson et al. |
| 4,118,009 A | 10/1978 | Chmura |
| 4,203,465 A | 5/1980 | Rissi |
| 4,253,156 A | 2/1981 | Lisle et al. |
| 4,275,752 A | 6/1981 | Collier et al. |
| 4,304,263 A | 12/1981 | Choate |
| 4,315,523 A | 2/1982 | Mahawili et al. |
| 4,327,757 A | 5/1982 | Weevers |
| 4,406,161 A | 9/1983 | Locke et al. |
| 4,462,915 A | 7/1984 | Friedman |
| 4,576,043 A | 3/1986 | Nguyen |
| 4,589,440 A | 5/1986 | Panet |
| 4,718,443 A | 1/1988 | Adney et al. |
| 4,741,359 A | 5/1988 | Siebald |
| 4,796,651 A | 1/1989 | Ginn et al. |
| 4,858,643 A | 8/1989 | Vavra et al. |
| 4,888,117 A | 12/1989 | Brown et al. |
| 4,904,285 A | 2/1990 | Yamada et al. |
| 4,918,995 A | 4/1990 | Pearman et al. |
| 5,003,810 A | 4/1991 | Jepson et al. |
| 5,044,199 A | 9/1991 | Drexel et al. |
| 5,052,363 A | 10/1991 | Stiles |
| 5,062,446 A | 11/1991 | Anderson |
| 5,080,131 A | 1/1992 | Ono et al. |
| 5,100,100 A | 3/1992 | Benson et al. |
| 5,100,551 A | 3/1992 | Pall et al. |
| 5,114,447 A | 5/1992 | Davis et al. |
| 5,123,439 A | 6/1992 | Powers |
| 5,129,418 A | 7/1992 | Shimomura et al. |
| 5,152,483 A | 10/1992 | Maeng |
| 5,159,951 A | 11/1992 | Ono et al. |
| 5,161,576 A | 11/1992 | Hekkert et al. |
| 5,187,771 A | 2/1993 | Uchida |
| 5,187,972 A | 2/1993 | Defriez |
| 5,190,068 A | 3/1993 | Philbin |
| 5,259,243 A | 11/1993 | Drexel et al. |
| 5,280,773 A | 1/1994 | Becker |
| 5,285,673 A | 2/1994 | Drexel et al. |
| 5,297,427 A | 3/1994 | Shambayati |
| 5,305,638 A | 4/1994 | Saghatchi et al. |
| 5,311,762 A | 5/1994 | Drexel |
| 5,321,992 A | 6/1994 | Mudd et al. |
| 5,325,705 A | 7/1994 | Tom |
| 5,329,966 A | 7/1994 | Fenimore et al. |
| 5,359,878 A | 11/1994 | Mudd |
| 5,419,133 A | 5/1995 | Schneider |
| 5,439,026 A | 8/1995 | Moriya et al. |
| 5,445,035 A | 8/1995 | Delajoud |
| 5,511,585 A | 4/1996 | Lee |
| 5,542,284 A | 8/1996 | Layzell et al. |
| 5,549,272 A | 8/1996 | Kautz |
| 5,583,282 A | 12/1996 | Tom |
| 5,624,409 A | 4/1997 | Seale |
| 5,660,207 A | 8/1997 | Mudd |
| 5,669,408 A | 9/1997 | Nishino et al. |
| 5,711,786 A | 1/1998 | Hinishaw |
| 5,730,181 A | 3/1998 | Doyle et al. |
| 5,762,086 A | 6/1998 | Ollivier |
| 5,804,717 A | 9/1998 | Lucas |
| 5,816,285 A | 10/1998 | Ohmi et al. |
| 5,865,205 A | 2/1999 | Wilmer |
| 5,868,159 A | 2/1999 | Loan et al. |
| 5,904,170 A | 5/1999 | Harvey et al. |
| 5,911,238 A | 6/1999 | Bump et al. |
| 5,917,066 A | 6/1999 | Eisenmann et al. |
| 5,918,616 A | 7/1999 | Sanfilippo et al. |
| 5,935,418 A | 8/1999 | Chakrabarty et al. |
| 5,944,048 A | 8/1999 | Bump et al. |
| 5,970,801 A | 10/1999 | Ciobanu et al. |
| 5,975,126 A | 11/1999 | Bump et al. |
| 5,988,211 A | 11/1999 | Cornell |
| 6,015,590 A | 1/2000 | Suntola |
| 6,026,834 A | 2/2000 | Azima |
| 6,026,847 A | 2/2000 | Reinicke et al. |
| 6,062,246 A | 5/2000 | Tanaka et al. |
| 6,062,256 A | 5/2000 | Miller et al. |
| 6,068,016 A * | 5/2000 | Manofsky, Jr. ..... C23C 16/4408 137/269 |
| 6,074,691 A | 6/2000 | Schmitt et al. |
| 6,080,219 A | 6/2000 | Jha et al. |
| 6,116,269 A | 9/2000 | Maxson |
| 6,119,710 A | 9/2000 | Brown |
| 6,125,869 A | 10/2000 | Horiuchi |
| 6,125,887 A * | 10/2000 | Pinto ..................... F16K 27/003 137/884 |
| 6,138,708 A | 10/2000 | Waldbusser |
| 6,152,162 A | 11/2000 | Balazy et al. |
| 6,178,995 B1 | 1/2001 | Ohmi et al. |
| 6,269,692 B1 | 8/2001 | Drexel et al. |
| 6,303,501 B1 | 10/2001 | Chen et al. |
| 6,314,991 B1 | 11/2001 | Gill |
| 6,352,001 B1 | 3/2002 | Wickert et al. |
| 6,422,256 B1 | 7/2002 | Balazy et al. |
| 6,422,264 B2 | 7/2002 | Ohmi et al. |
| 6,425,281 B1 | 7/2002 | Sheriff et al. |
| 6,443,174 B2 | 9/2002 | Mudd |
| 6,539,968 B1 | 4/2003 | White et al. |
| 6,561,218 B2 | 5/2003 | Mudd |
| 6,564,825 B2 | 5/2003 | Lowery et al. |
| 6,631,334 B2 | 10/2003 | Grosshart |
| 6,655,408 B2 | 12/2003 | Linthorst |
| 6,712,084 B2 | 3/2004 | Shajii et al. |
| 6,752,166 B2 | 6/2004 | Lull et al. |
| 6,799,603 B1 | 10/2004 | Moore |
| 6,832,628 B2 | 12/2004 | Thordarson et al. |
| 6,868,862 B2 | 3/2005 | Shajii et al. |
| 6,881,263 B2 | 4/2005 | Lindfors et al. |
| 6,948,508 B2 | 9/2005 | Shajii et al. |
| 7,037,372 B2 | 5/2006 | Lindfors et al. |
| 7,073,392 B2 | 7/2006 | Lull et al. |
| 7,136,767 B2 | 11/2006 | Shajii et al. |
| 7,216,019 B2 | 5/2007 | Tinsley et al. |
| 7,252,032 B2 | 8/2007 | Scheffel et al. |
| 7,334,602 B2 | 2/2008 | Ahn |
| 7,337,805 B2 | 3/2008 | Brown et al. |
| 7,353,841 B2 | 4/2008 | Kono et al. |
| 7,370,664 B2 | 5/2008 | Glite |
| 7,424,346 B2 | 9/2008 | Shajii et al. |
| 7,431,045 B2 | 10/2008 | Mudd et al. |
| 7,474,968 B2 | 1/2009 | Ding et al. |
| 7,552,015 B2 | 6/2009 | Shajii et al. |
| 7,615,120 B2 | 11/2009 | Shajii et al. |
| 7,628,861 B2 | 12/2009 | Clark |
| 7,662,233 B2 | 2/2010 | Sneh |
| 7,680,399 B2 | 3/2010 | Buchanan et al. |
| 7,682,946 B2 | 3/2010 | Ma et al. |
| 7,693,606 B2 | 4/2010 | Ahmad et al. |
| 7,706,925 B2 | 4/2010 | Ding et al. |
| 7,717,061 B2 | 5/2010 | Ishizaka et al. |
| 7,757,554 B2 | 7/2010 | Ding et al. |
| 7,809,473 B2 | 10/2010 | Shajii et al. |
| 7,826,986 B2 | 11/2010 | McDonald |
| 7,850,779 B2 | 12/2010 | Ma et al. |
| 7,874,208 B2 | 1/2011 | Redemann et al. |
| 7,881,829 B2 | 2/2011 | Yoneda et al. |
| 7,891,228 B2 | 2/2011 | Ding et al. |
| 7,905,139 B2 | 3/2011 | Lull |
| 7,918,238 B2 * | 4/2011 | Tanaka .................. G01F 1/6847 137/10 |
| 7,922,150 B2 | 4/2011 | Cripps et al. |
| 7,974,544 B2 | 7/2011 | Kobayashi |
| 7,979,165 B2 | 7/2011 | Gotoh et al. |
| 8,100,382 B2 | 1/2012 | Robertson, III et al. |
| 8,104,323 B2 | 1/2012 | Yasuda |
| 8,112,182 B2 | 2/2012 | Tokuhisa et al. |
| 8,183,781 B2 | 5/2012 | Sangam |
| 8,201,989 B2 | 6/2012 | Itoh et al. |
| 8,205,629 B2 | 6/2012 | Gregor et al. |
| 8,265,795 B2 | 9/2012 | Takahashi et al. |

(56) References Cited

U.S. PATENT DOCUMENTS

| | | |
|---|---|---|
| 8,282,992 B2 | 10/2012 | Myo et al. |
| 8,291,857 B2 | 10/2012 | Lam et al. |
| 8,293,015 B2 | 10/2012 | Lam et al. |
| 8,340,827 B2 | 12/2012 | Yun et al. |
| 8,343,258 B2 | 1/2013 | Guan |
| 8,343,279 B2 | 1/2013 | Myo et al. |
| 8,356,623 B2 | 1/2013 | Isobe et al. |
| 8,376,312 B2 | 2/2013 | Mudd et al. |
| 8,382,897 B2 | 2/2013 | Sangam |
| 8,408,245 B2 | 4/2013 | Feldman et al. |
| 8,443,649 B2 | 5/2013 | Yasuda et al. |
| 8,460,753 B2 | 6/2013 | Xiao et al. |
| 8,504,318 B2 | 8/2013 | Mendelson et al. |
| 8,505,478 B2 | 8/2013 | Suekane et al. |
| 8,511,337 B2 | 8/2013 | Nishimura |
| 8,573,247 B2 | 11/2013 | Ushigusa et al. |
| 8,744,784 B2 | 6/2014 | Yasuda et al. |
| 8,746,057 B2 | 6/2014 | Yasuda et al. |
| 8,770,215 B1 | 7/2014 | Mudd et al. |
| 8,789,556 B2 | 7/2014 | Yasuda et al. |
| 8,793,082 B2 | 7/2014 | Ding et al. |
| 8,800,589 B2 | 8/2014 | Minami et al. |
| 8,851,105 B2 | 10/2014 | Kashima et al. |
| 8,910,656 B2 | 12/2014 | Yasuda |
| 8,950,433 B2* | 2/2015 | Manofsky, Jr. .......... G05D 7/00 137/884 |
| 9,027,585 B2 | 5/2015 | Smirnov |
| 9,081,388 B2 | 7/2015 | Tanaka et al. |
| 9,188,989 B1 | 11/2015 | Mudd et al. |
| 9,207,139 B2 | 12/2015 | Jones et al. |
| 9,223,318 B2 | 12/2015 | Takeuchi et al. |
| 9,690,301 B2 | 6/2017 | Mudd et al. |
| 2001/0013363 A1 | 8/2001 | Kitayama et al. |
| 2002/0002996 A1 | 1/2002 | Mudd |
| 2002/0014206 A1 | 2/2002 | Mudd |
| 2002/0046612 A1 | 4/2002 | Mudd |
| 2002/0095225 A1 | 7/2002 | Huang et al. |
| 2004/0007180 A1 | 1/2004 | Yamasaki et al. |
| 2004/0083807 A1 | 5/2004 | Mudd et al. |
| 2005/0056211 A1 | 3/2005 | Lindfors et al. |
| 2005/0087299 A1 | 4/2005 | Okabe et al. |
| 2005/0098906 A1 | 5/2005 | Satoh et al. |
| 2006/0005883 A1 | 1/2006 | Mudd et al. |
| 2006/0037644 A1 | 2/2006 | Nishikawa et al. |
| 2006/0060139 A1 | 3/2006 | Meneghini et al. |
| 2006/0124173 A1 | 6/2006 | An |
| 2006/0130755 A1 | 6/2006 | Clark |
| 2007/0089789 A1 | 4/2007 | Mudd et al. |
| 2007/0110636 A1 | 5/2007 | Lee et al. |
| 2007/0227659 A1 | 10/2007 | Iizuka |
| 2008/0041481 A1 | 2/2008 | Mudd et al. |
| 2008/0305014 A1 | 12/2008 | Honda |
| 2009/0101217 A1 | 4/2009 | Ushigusa et al. |
| 2010/0110399 A1 | 5/2010 | Lyons |
| 2010/0138051 A1 | 6/2010 | Glime |
| 2010/0224264 A1 | 9/2010 | Homan et al. |
| 2010/0269924 A1 | 10/2010 | Yasuda |
| 2011/0108126 A1 | 5/2011 | Monkowski et al. |
| 2012/0116596 A1 | 5/2012 | Yoneda et al. |
| 2012/0132291 A1 | 5/2012 | Monkowski et al. |
| 2012/0180876 A1 | 7/2012 | Hayashi et al. |
| 2012/0318383 A1 | 12/2012 | Yasuda et al. |
| 2013/0092256 A1 | 4/2013 | Yasuda et al. |
| 2013/0092258 A1 | 4/2013 | Yasuda et al. |
| 2013/0118596 A1 | 5/2013 | Horsky |
| 2013/0186499 A1 | 7/2013 | Yada et al. |
| 2014/0034164 A1 | 2/2014 | Yasuda |
| 2014/0069527 A1* | 3/2014 | Mudd ................. G05D 7/0635 137/487 |
| 2014/0083514 A1 | 3/2014 | Ding |
| 2014/0158211 A1 | 6/2014 | Ding et al. |
| 2014/0190578 A1 | 7/2014 | Hayashi |
| 2014/0230915 A1 | 8/2014 | Mudd et al. |
| 2014/0260963 A1 | 9/2014 | Wang |
| 2015/0007897 A1 | 1/2015 | Valentine et al. |
| 2015/0027558 A1 | 1/2015 | Kehoe et al. |
| 2015/0121988 A1 | 5/2015 | Banares et al. |
| 2015/0212524 A1 | 7/2015 | Kehoe et al. |
| 2015/0362391 A1 | 12/2015 | Suzuki et al. |
| 2016/0011604 A1 | 1/2016 | Mudd et al. |
| 2016/0018828 A1 | 1/2016 | Mudd et al. |
| 2016/0041564 A1 | 2/2016 | Mudd et al. |
| 2016/0108523 A1* | 4/2016 | Lee ..................... C23C 16/4404 156/89.11 |
| 2016/0124439 A1 | 5/2016 | Yasuda et al. |

FOREIGN PATENT DOCUMENTS

| | | | |
|---|---|---|---|
| CN | 103838261 | 6/2014 | |
| DE | 69535683 | 1/2009 | |
| EP | 0468793 | 1/1992 | |
| EP | 0671484 | 9/1995 | |
| EP | 0689040 | 12/1995 | |
| JP | 11119835 | 4/1999 | |
| JP | 2000018407 | 1/2000 | |
| JP | 2004157719 | 6/2004 | |
| JP | 3557087 | 8/2004 | |
| JP | 2004302914 | 10/2004 | |
| JP | 2007041870 | 2/2007 | |
| JP | 4137666 | 8/2008 | |
| JP | 4146746 | 9/2008 | |
| JP | 2009079667 | 4/2009 | |
| JP | 4351495 | 10/2009 | |
| JP | 2009300403 | 12/2009 | |
| JP | 4572139 | 10/2010 | |
| JP | 4589846 | 12/2010 | |
| JP | 4705140 | 6/2011 | |
| JP | 2011171337 | 9/2011 | |
| JP | 4974000 | 7/2012 | |
| JP | 5090559 | 12/2012 | |
| JP | 5091821 | 12/2012 | |
| JP | 2016035462 A * | 3/2016 | ........... G05D 7/0635 |
| JP | 2016035462 A | 3/2016 | |
| TW | 201414990 | 4/2014 | |
| WO | WO8700267 | 1/1987 | |
| WO | WO03081361 | 10/2003 | |
| WO | WO200401516 | 12/2003 | |
| WO | WO2011040409 | 4/2011 | |

* cited by examiner

FLOW CONTROL SYSTEM, METHOD, AND APPARATUS

CROSS REFERENCE TO RELATED APPLICATIONS

The present application is a continuation of U.S. patent application Ser. No. 15/638,742, filed Jun. 30, 2017 which claims the benefit of U.S. Provisional Patent Application No. 62/357,113, filed Jun. 30, 2016, the entirety of which is incorporated herein by reference.

BACKGROUND OF THE INVENTION

Mass flow control has been one of the key technologies in semiconductor chip fabrication. Mass flow controllers (MFCs) are important components for delivering process gases for semiconductor fabrication. An MFC is a device used to measure and control the flow of fluids and gasses.

As the technology of chip fabrication has improved, so has the demand on the MFC. Semiconductor fabrication processing increasingly requires increased performance, including more accurate measurements, lower equipment costs, greater speed, more consistency in timing in the delivery of gases, and space-saving layouts.

SUMMARY OF THE INVENTION

The present technology is directed to a method of making a plurality of mass flow controllers having different operating characteristics while maintaining a common monolithic base. Thus, different flow components such as cap components, laminar flow components, control valve components, pressure transducer components, volumetric expander components, on/off valve components, and temperature sensor components may be coupled to substantially identical monolithic bases.

In one implementation, the method of making mass flow controllers comprises providing a plurality of substantially identical monolithic bases, each of the monolithic bases comprising a gas inlet, a gas outlet, and a plurality of flow component mounting regions. The method further comprises coupling a first set of flow components to the flow component mounting regions of a first one of the monolithic bases so that a fluid path is formed from the gas inlet to the gas outlet of the first one of the monolithic bases to which each component of the first set of flow components is in fluid communication, thereby creating a first mass flow controller having a first set of operating characteristics. Finally, a second set of flow components are coupled to the flow component mounting regions of a second one of the monolithic bases so that a fluid path is formed from the gas inlet to the gas outlet of the second one of the monolithic bases to which each component of the second set of flow components is in fluid communication, thereby creating a second mass flow controller having a second set of operating characteristics that are different than the first set of operating characteristics.

In another implementation, the method of making mass flow controllers having different operating characteristics comprises providing a plurality of substantially identical monolithic bases, each of the monolithic bases comprising a gas inlet, a gas outlet, and a plurality of flow component mounting regions. The method further comprises coupling a first set of flow components to the flow component mounting regions of a first one of the monolithic bases, thereby creating a first mass flow controller having a first set of operating characteristics. Finally, a second set of flow components are coupled to the flow component mounting regions of a second one of the monolithic bases, thereby creating a second mass flow controller having a second set of operating characteristics that are different than the first set of operating characteristics.

In yet another implementation, the method comprises providing a plurality of substantially identical monolithic bases, each of the monolithic bases comprising a gas inlet, a gas outlet, and a plurality of flow component mounting regions. A first set of flow components are coupled to the flow component mounting regions of a first one of the monolithic bases. Lastly, a second set of flow components are coupled to the flow component mounting regions of a first one of the monolithic bases, wherein the first and second sets of flow components comprise different types of flow components.

In another implementation, the invention is a mass flow control apparatus having a monolithic base. The monolithic base has a gas inlet, a gas outlet, a first flow component mounting region, a second flow component mounting region, and a third flow component mounting region. The first flow component mounting region has a first inlet port and a first outlet port, the first inlet port being fluidly coupled to the gas inlet of the monolithic base. The second flow component mounting region has a second inlet port, a second outlet port, and a first auxiliary port.

In yet another implementation, the invention is a mass flow control apparatus having a monolithic base. The monolithic base has a gas inlet, a gas outlet, a first flow component mounting region, a second flow component mounting region, and a third flow component mounting region. A first valve is coupled to the first flow component mounting region. A cap component is coupled to one of the second or third flow component mounting regions. The first flow component region has a first inlet port and a first outlet port, the first inlet port being fluidly coupled to the gas inlet of the monolithic base. The second flow component mounting region comprises a second inlet port, a second outlet port, and a first auxiliary port.

In a further implementation, the invention is a mass flow control apparatus having a monolithic base. The monolithic base has a gas inlet, a gas outlet, a first flow component mounting region, a second flow component mounting region, and a third flow component mounting region. A first valve is coupled to the first flow component mounting region. A second valve is coupled to the second flow component mounting region. A third valve is coupled to the third flow component mounting region. The first flow component mounting region has a first inlet port fluidly coupled to the gas inlet of the monolithic base. The second flow component mounting region has a first auxiliary port. The third valve is fluidly coupled to the gas outlet of the monolithic base.

Further areas of applicability of the present technology will become apparent from the detailed description provided hereinafter. It should be understood that the detailed description and specific examples, while indicating the preferred implementation, are intended for purposes of illustration only and are not intended to limit the scope of the technology.

BRIEF DESCRIPTION OF THE DRAWINGS

The invention of the present disclosure will become more fully understood from the detailed description and the accompanying drawings, wherein.

DETAILED DESCRIPTION

Figure 1:
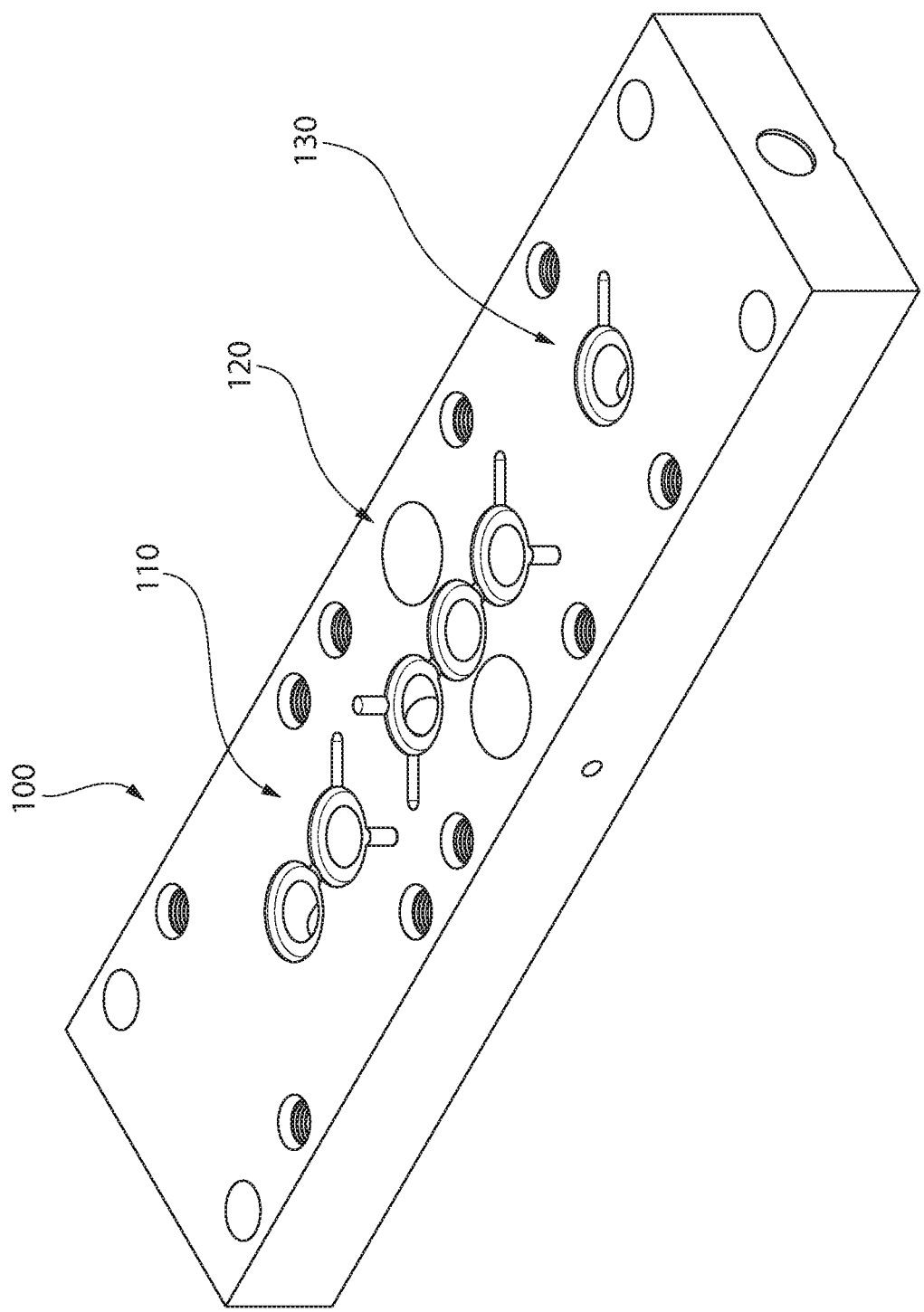
FIG. 1 is a perspective view of a first embodiment of the monolithic base.
Figure 2:
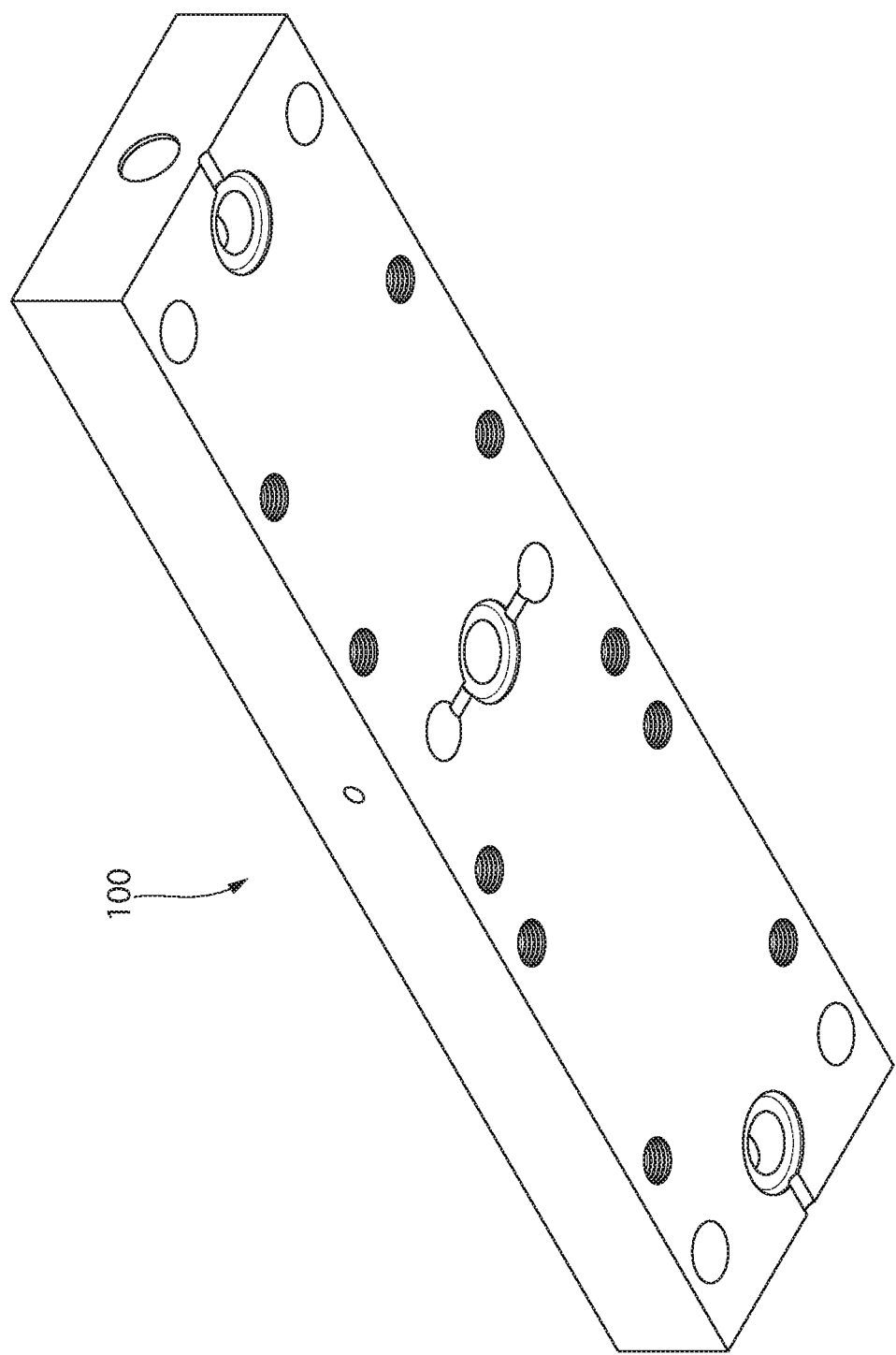
FIG. 2 is a lower perspective view of the monolithic base of FIG. 1.
Figure 3:
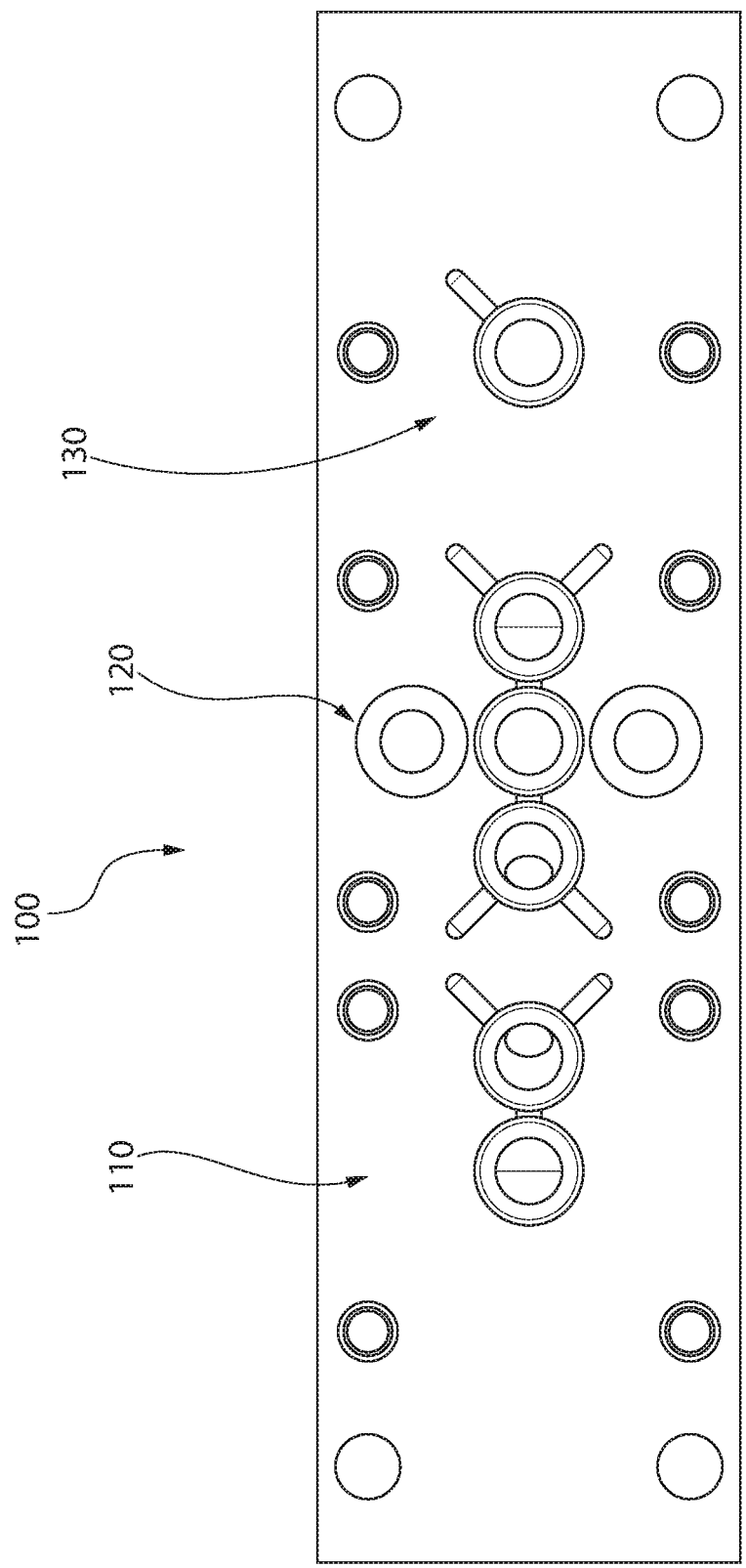
FIG. 3 is a top view of the monolithic base of FIG. 1.
Figure 4:
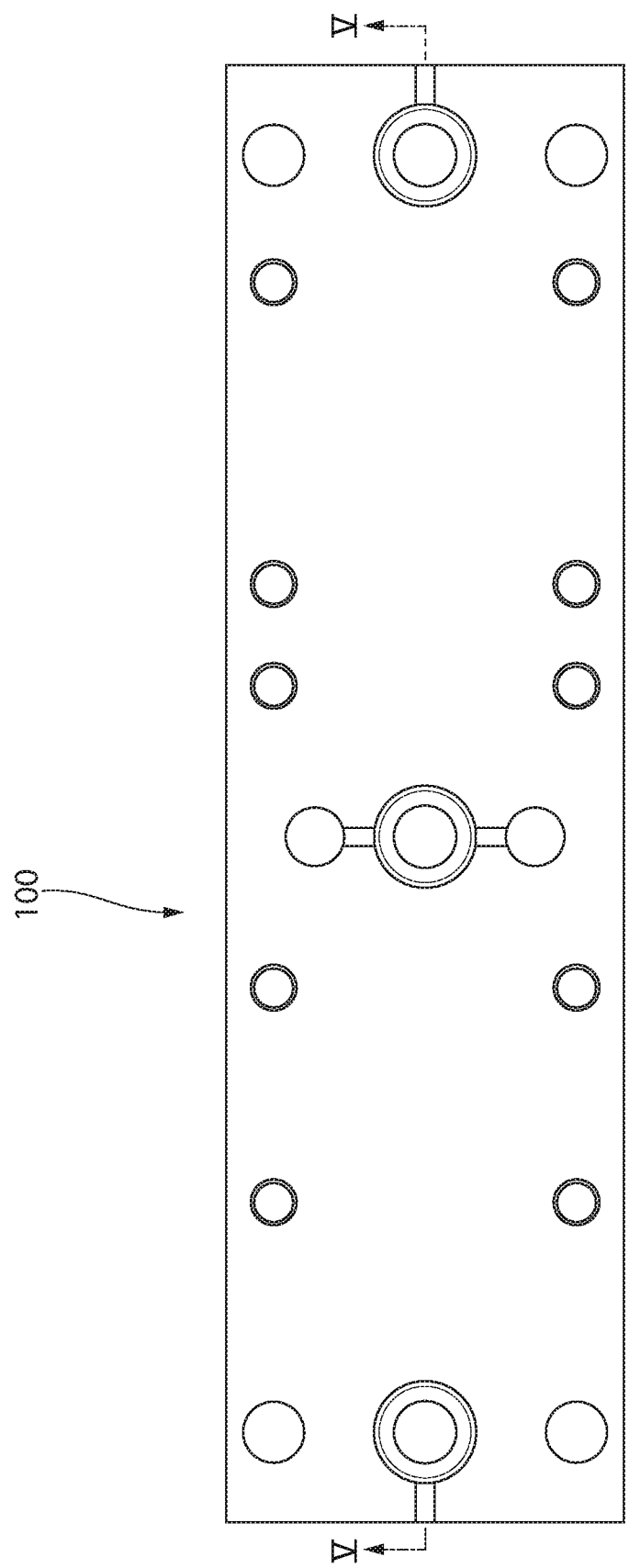
FIG. 4 is a bottom view of the monolithic base of FIG. 1.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

The present invention is directed to a modular method of making mass flow controllers which reduces total system cost and time to production. Customers require a variety of mass flow controllers within a single semiconductor process to permit them to apply a diverse array of gases in a wide range of mass flow rates. In an effort to accommodate this need, manufacturers of mass flow control equipment have designed mass flow controllers with a variety of component configurations to achieve specific operating characteristics. This often requires different component configurations. Due to the limited space available for mass flow controllers, a custom configuration for the mounting base is typically required. This is often accomplished through a plurality of mounting base components which are assembled to meet particular needs. Alternately, a custom mounting base may be fabricated which is unitary and incorporates all of the necessary ports and passages required for the mass flow controller currently being manufactured. However, due to the wide variation in operating characteristics required in a product line, the mounting bases are customized for the specific application and desired operating characteristics.

FIG. 1 shows a perspective view of a first embodiment of a monolithic base 100 according to the present invention. FIGS. 2-5 show the monolithic base in greater detail. The monolithic base 100 has a plurality of flow component mounting regions where flow components may be mounted. The plurality of flow component mounting regions include a first flow component mounting region 110, a second flow component mounting region 120, and a third flow component mounting region 130. In the present embodiment of the monolithic base 100, the first flow component mounting region 110 and the second flow component mounting region 120 are both capable of being used as multi-function ports which may incorporate a variety of flow components. In contrast, the third flow component mounting region 130 is a sensing port intended to accept a pressure transducer component.

Figure 5:
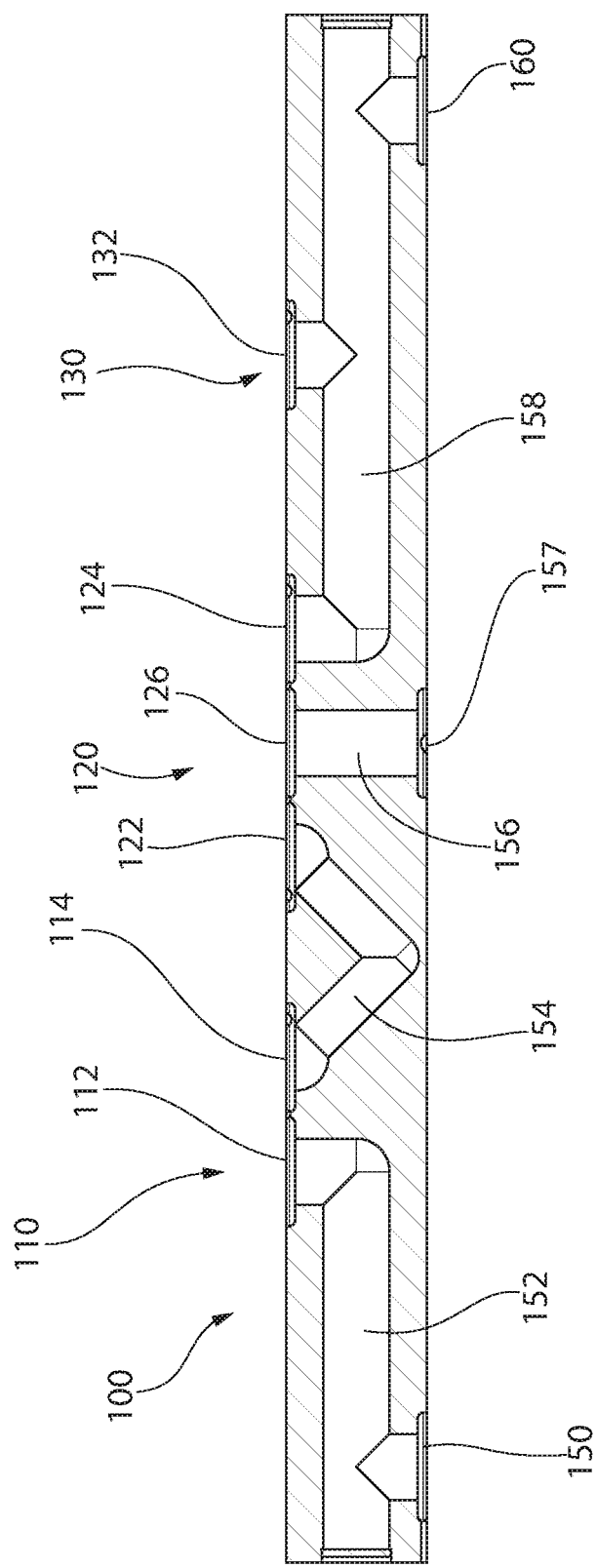
FIG. 5 is a cross sectional view taken along the line V-V of FIG. 4.

Turning to FIG. 5, a cross section of the monolithic base 100 is shown. A gas inlet 150 is located on the lower left side of the monolithic base 100. When the completed mass flow controller is installed in process machinery, process gas is supplied to the gas inlet 150. It then flows downstream to the first flow component mounting region 110. The first flow component mounting region 110 has an inlet port 112 that is directly connected to the gas inlet 150 by a first flow passage 152. The first flow component region 110 also has an outlet port 114 that is not fluidly connected to the inlet port 112.

The outlet port 114 of the first flow component mounting region 110 is fluidly connected to an inlet port 122 of the second flow component mounting region 120 by a second flow passage 154. The second flow component mounting region 120 also contains an outlet port 124 and an auxiliary port 126. The auxiliary port 126 feeds an auxiliary passage 156 which has a gas vent 157 located on the underside of the monolithic base 100. The outlet port 124 of the second flow component mounting region 120 is fluidly connected by a third flow passage 158 to a gas outlet 160 located underneath the right side of the monolithic base 100. The third flow component mounting region 130 also has a sensing port 132 that is also connected to the third flow passage 158 so that a device attached to the third flow component mounting region 130 can sense the pressure within the third flow passage 158.

Figure 6:
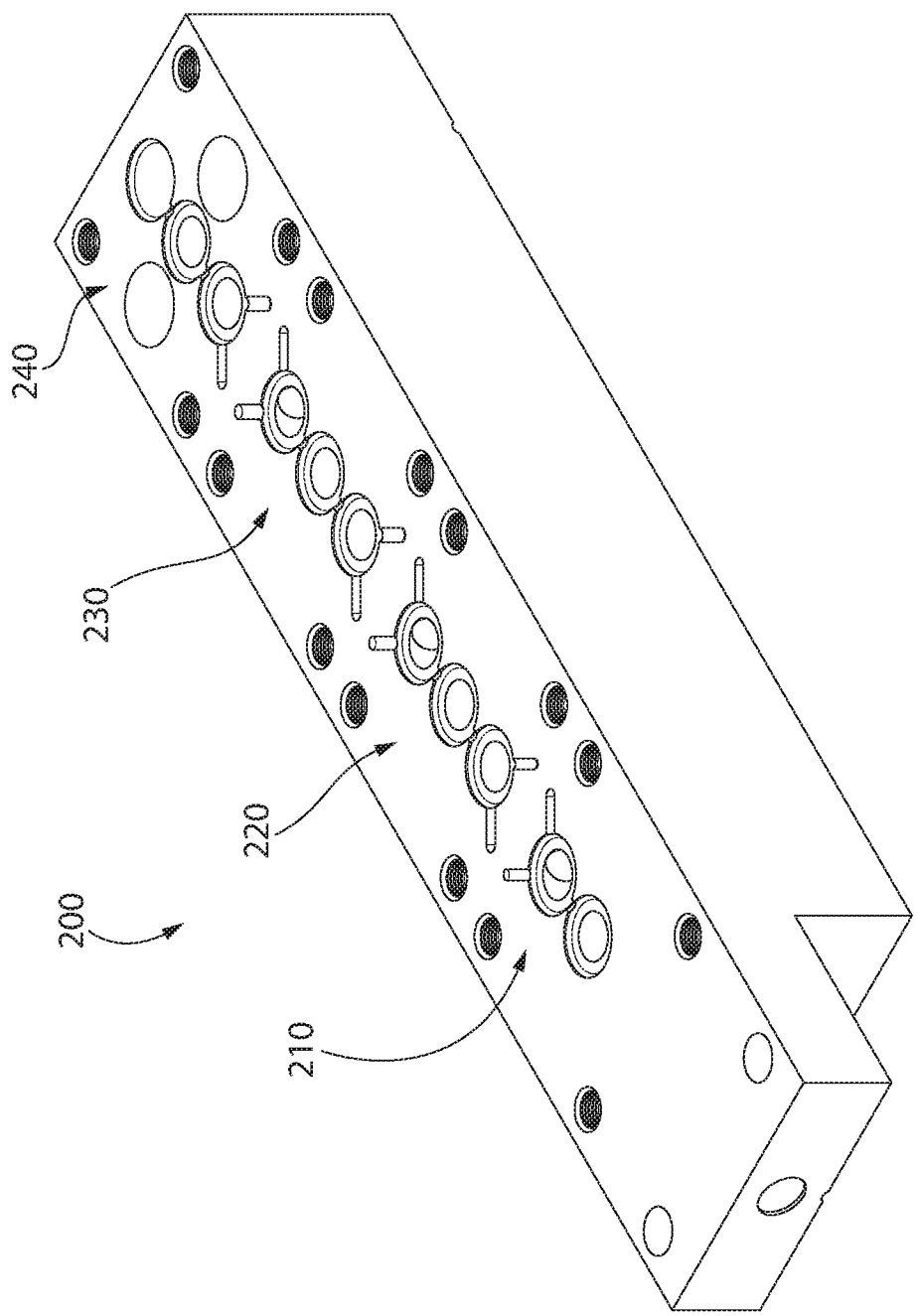
FIG. 6 is a perspective view of a second embodiment of the monolithic base.
Figure 7:
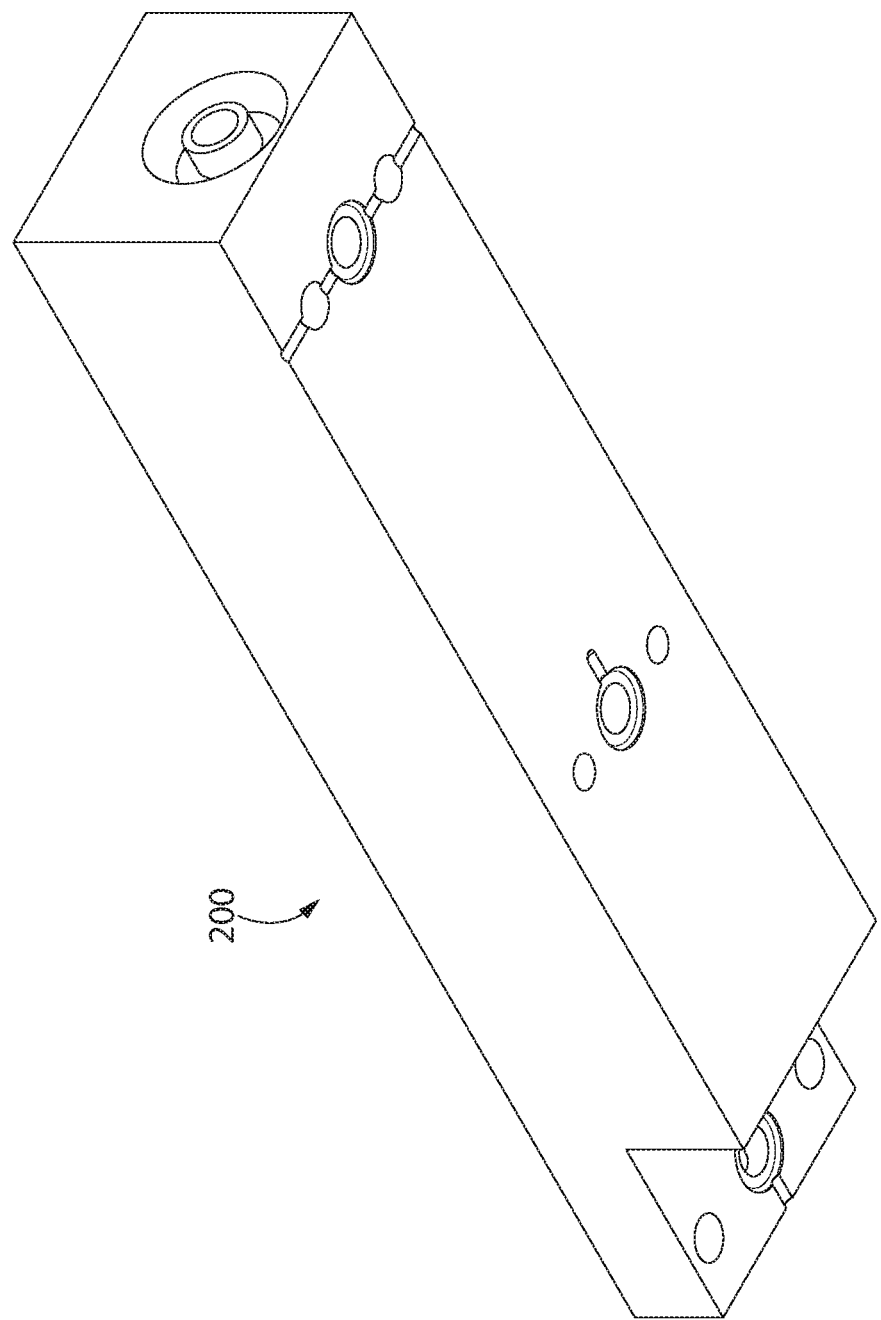
FIG. 7 is a lower perspective view of the monolithic base of FIG. 6.
Figure 8:
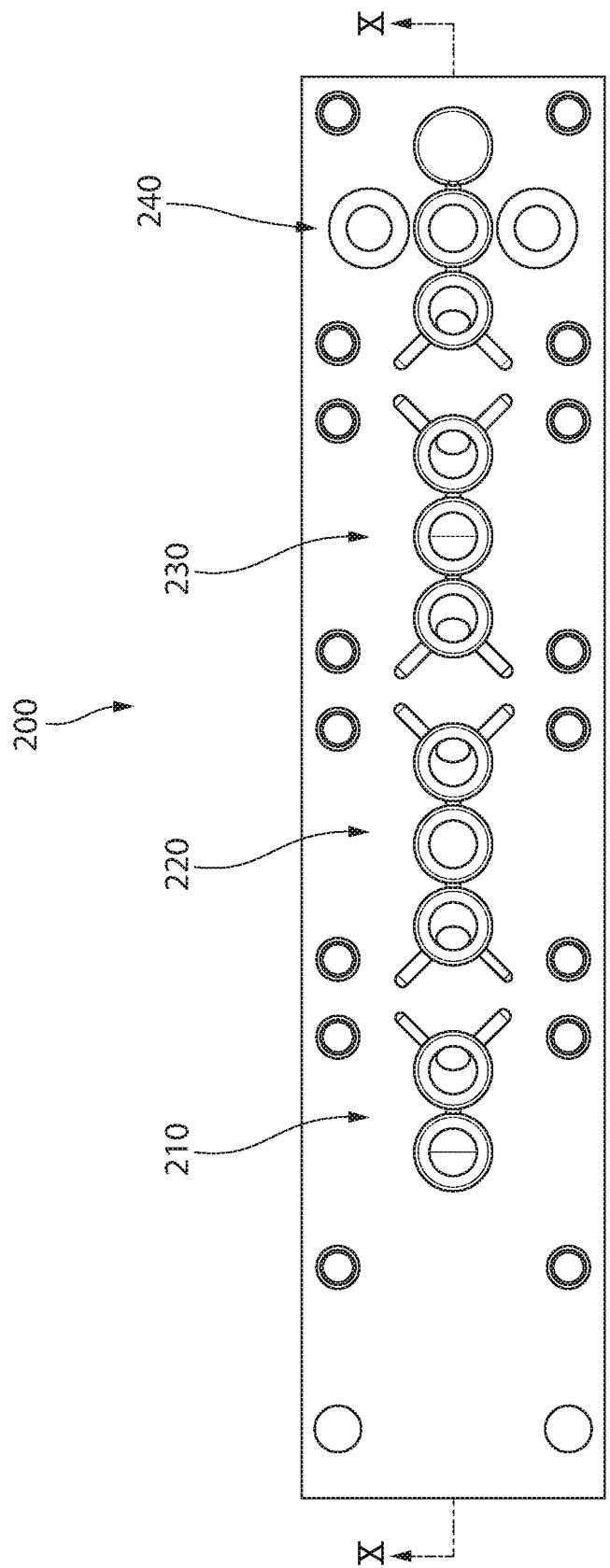
FIG. 8 is a top view of the monolithic base of FIG. 6.
Figure 9:
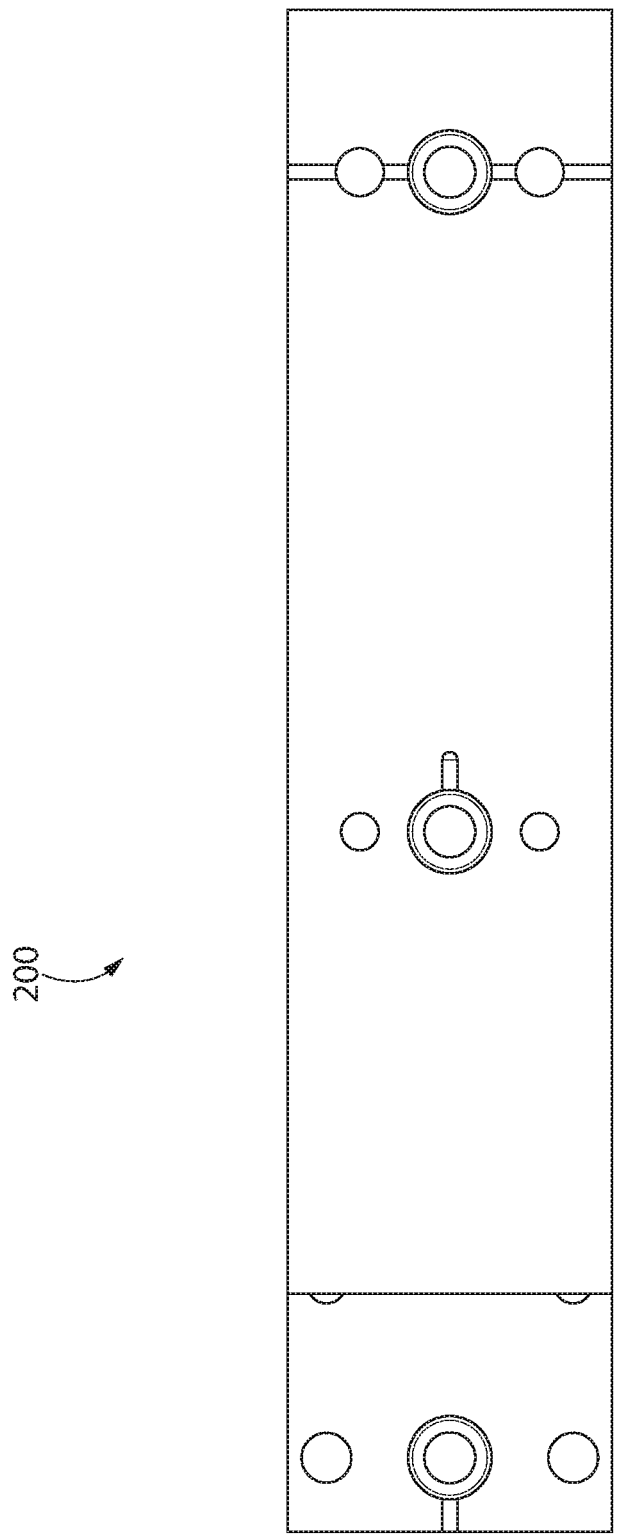
FIG. 9 is a bottom view of the monolithic base of FIG. 6.
Figure 10:
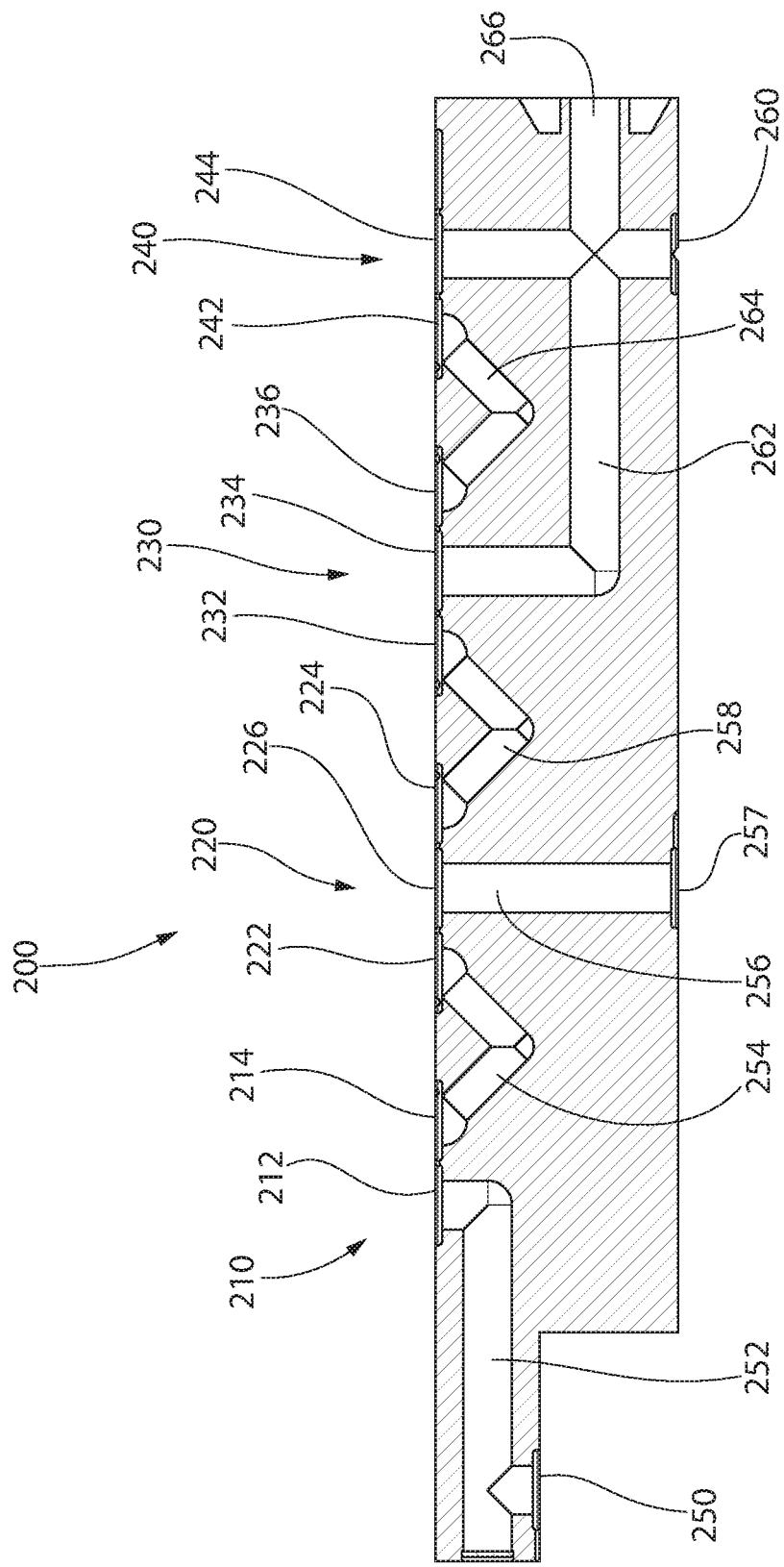
FIG. 10 is a cross sectional view taken along the line X-X of FIG. 8.

FIGS. 6-10 show a second embodiment of the monolithic base 200. This embodiment is formed with a greater thickness so that there is adequate room to provide for additional flow passages and a greater number of flow component mounting regions. As best seen in FIG. 6, the monolithic base 200 has a first flow component mounting region 210, a second flow component mounting region 220, a third flow component mounting region 230, and a fourth flow component mounting region 240. Turning to FIG. 10, a cross section of the monolithic base 200 is provided to better show the internal configuration.

The first flow component mounting region 210 has an inlet port 212 and an outlet port 214. The second flow component mounting region 220 has an inlet port 222, an outlet port 224, and an auxiliary port 226. The third flow component mounting region 230 has an inlet port 232, an outlet port 234, and an auxiliary port 236. The fourth flow component mounting region 240 has an inlet port 242 and an outlet port 244.

Similar to the monolithic base 100 discussed above, process gas is supplied to a mass flow controller at the gas inlet 250 located on the underside of the monolithic base 200. The process gas then flows through a first flow passage 252 to the inlet port 212 of the first flow component mounting region. The outlet port 214 of the first flow component mounting region 210 is connected by a second flow passage 254 to the inlet port 222 of the second flow component mounting region 220. The auxiliary port 226 of the second flow component mounting region 220 also connects to an auxiliary passage 256 which rims between the auxiliary port 226 and a gas vent 257 located on the underside of the monolithic base 200. The outlet port 224 of the second flow component mounting region 220 is connected to the inlet port 232 of the third flow component mounting region 230 by a third flow passage 258.

However, unlike the second flow component mounting region 220, the auxiliary port 236 of the third flow component mounting region 230 is located to the right of the outlet port 234. The outlet port 234 of the third flow component mounting region 230 is connected to a gas outlet 260 located on the underside of the monolithic base 200 by the fourth flow passage 262. The fourth flow passage 262 also connects the outlet port 244 of the fourth flow component mounting region 240 to the gas outlet 260. Finally, the auxiliary port 236 of the third flow component mounting region 230 is connected to the inlet port 242 of the fourth flow component mounting region 240 by a fifth flow passage 264. An accessory port 266 is located at the rightmost end of the monolithic base 200, and may be plugged or welded if the design does not require it. Alternately, the accessory port 266 may be used to attach a pressure transducer component or other flow component.

Figure 11:
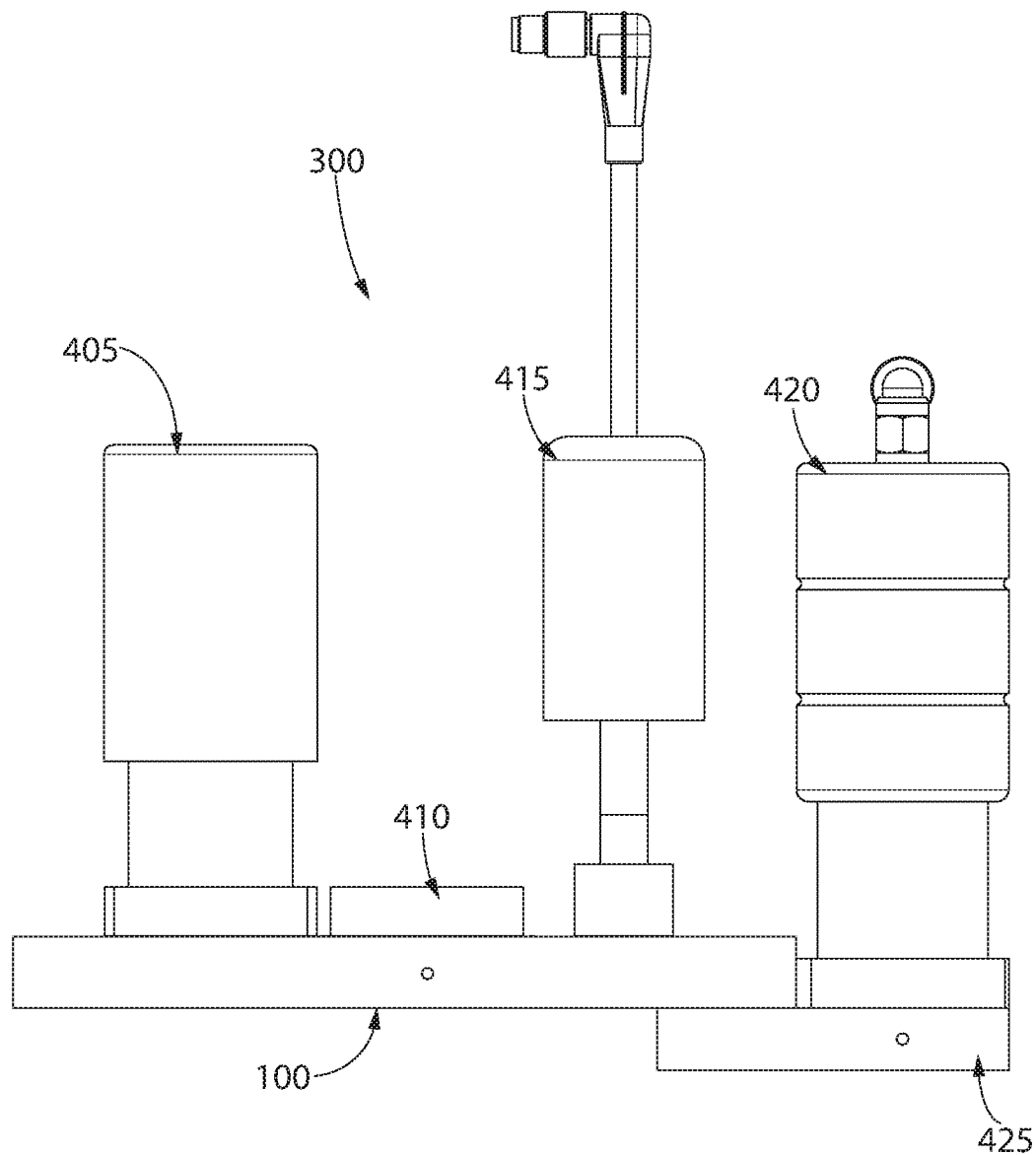
FIG. 11 is a side view of a mass flow controller in accordance with a first embodiment.
Figure 12:
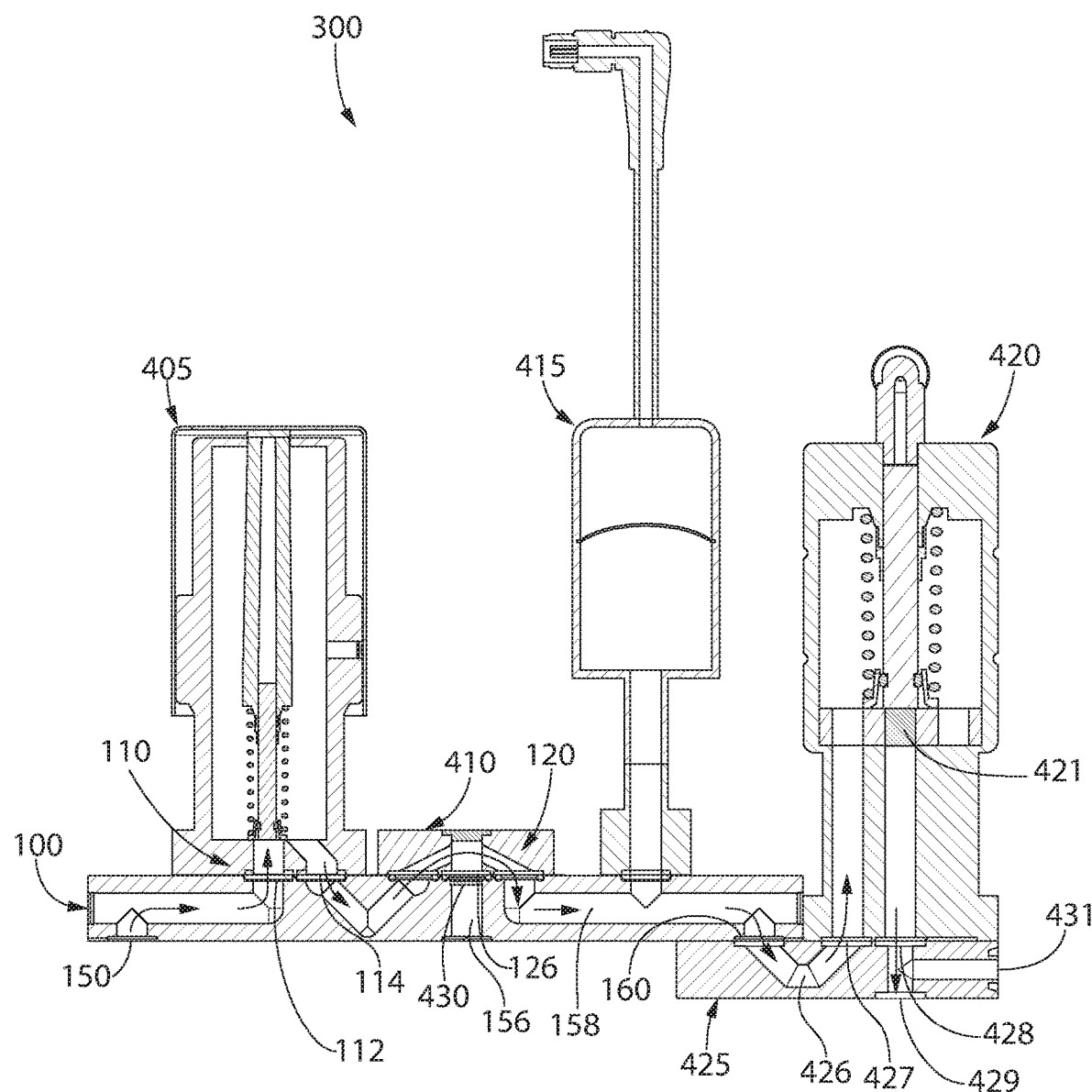
FIG. 12 is a cross sectional view of the mass flow controller of FIG. 11 illustrating the ports and flow passages.

FIGS. 11 and 12 show a first embodiment of a mass flow controller 300 incorporating the monolithic base 100 discussed above. The mass flow controller 300 also comprises a control valve component 405, a cap component 410, a pressure transducer component 415, a laminar flow component 420, and a substrate block 425. In this embodiment, the mass flow controller may be sized to provide a desired flow rate by selecting a laminar flow component 420 having an appropriately sized restrictor 421. The restrictor 421 may be selected so as to change the range of mass flow rates that the mass flow controller 300 may supply. The restrictor 421 may be formed as a porous block, a device having small orifices or channels, or any other means of providing a restriction to process gas flow that is consistent and repeatable across a target dynamic operating range of mass flow rates. The restrictor 421 has a greater resistance to flow than the passages upstream and downstream of the restrictor 421.

The flow path of the process gas is indicated by arrows which illustrate the path that the process gas takes through the mass flow controller 300. The process gas provided at the gas inlet 150 is supplied to the inlet port 112 of the first flow component mounting region 110. The inlet port 112 is fluidly coupled to the control valve component 405. The control valve component 405 meters the amount of process gas which passes to the outlet port 114. The control valve component 405 is capable of providing proportional control of the process gas such that it need not be fully open or closed, but instead may have intermediate states to permit control of the mass flow rate of process gas. After the control valve component 405, process gas passes through the cap component 410. The cap component 410 which has a passage formed therein to permit unrestricted flow of the gas from the inlet port 122 to the outlet port 124 at the second flow component mounting region 120. The auxiliary port 126 is blocked off by a blocking seal 430 which prevents process gas from flowing into the auxiliary passage 156. The cap component 410 also has a port for coupling a pressure transducer component 415 if desired. In the present embodiment, the top port on the cap component 410 is plugged because only one pressure transducer component 415 is required.

Process gas then flows from the outlet port 124 of the second component mounting region 120 through the third flow passage 158 to the gas outlet 160. The pressure transducer component 415 is coupled to the third flow component mounting region 130. The pressure transducer 415 samples the pressure of the process gas in the third flow passage 158. The process gas then flows into the substrate block 425 through a first substrate flow passage 426 to a substrate block inlet port 427. The laminar flow component 420 is coupled to the substrate block 425. The substrate block 425 is typically preinstalled on a customer's process equipment, and generally has a standardized arrangement of ports.

Process gas then flows through the laminar flow component 420, past the restrictor 421, and through the substrate block outlet port 428. The laminar flow component 420 incorporates an on/off valve component integrally within the laminar flow component 420 to permit complete shutoff of process gas flow. The substrate gas outlet 429 is connected to a process manifold external to the mass flow controller 300. The substrate block 425 further comprises an accessory port 431 which may be plugged or welded if not required. Alternately, another pressure transducer component 415 may be attached to the accessory port 431.

Figure 13:
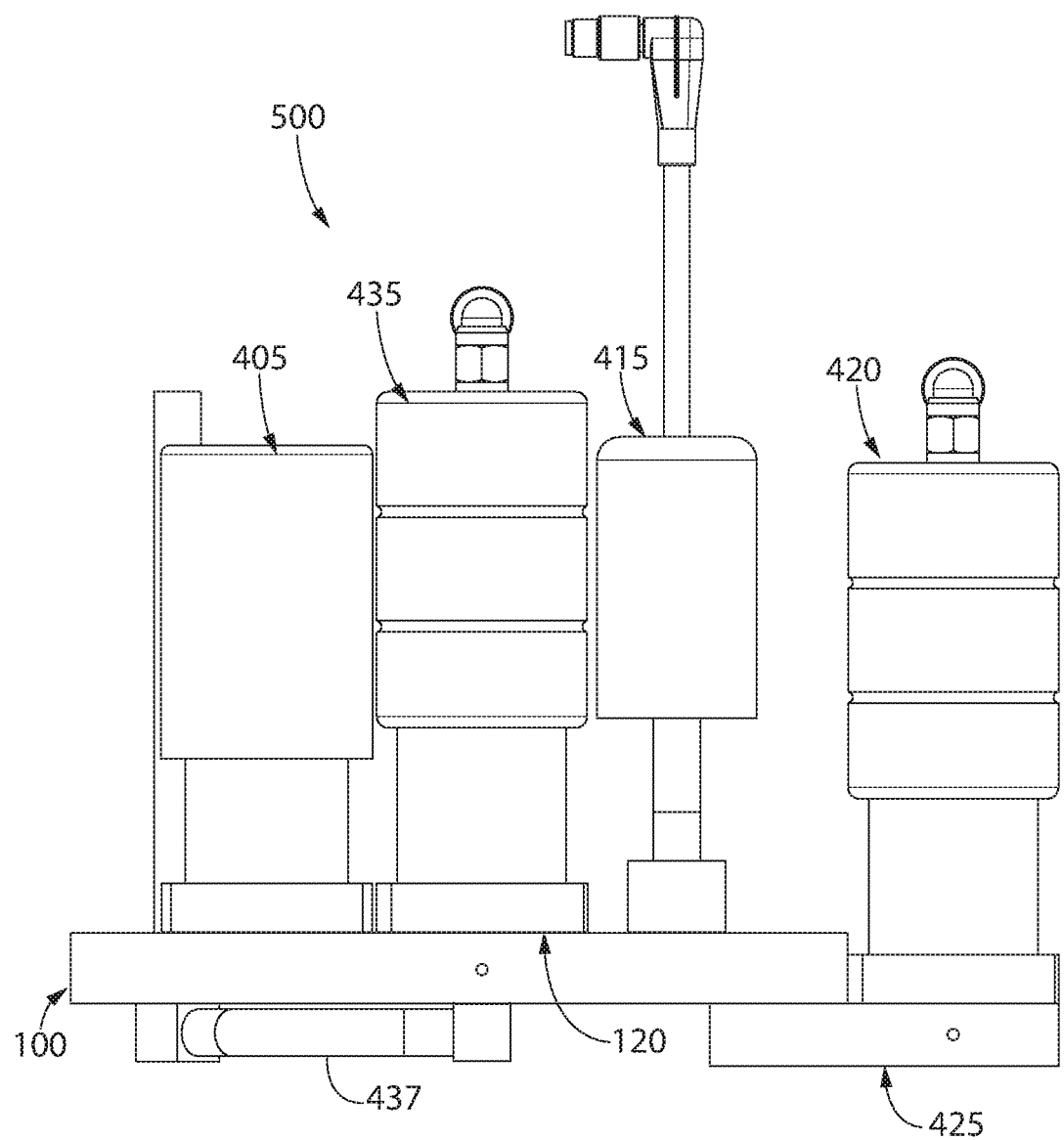
FIG. 13 is a side view of a mass flow controller in accordance with a second embodiment.
Figure 14:
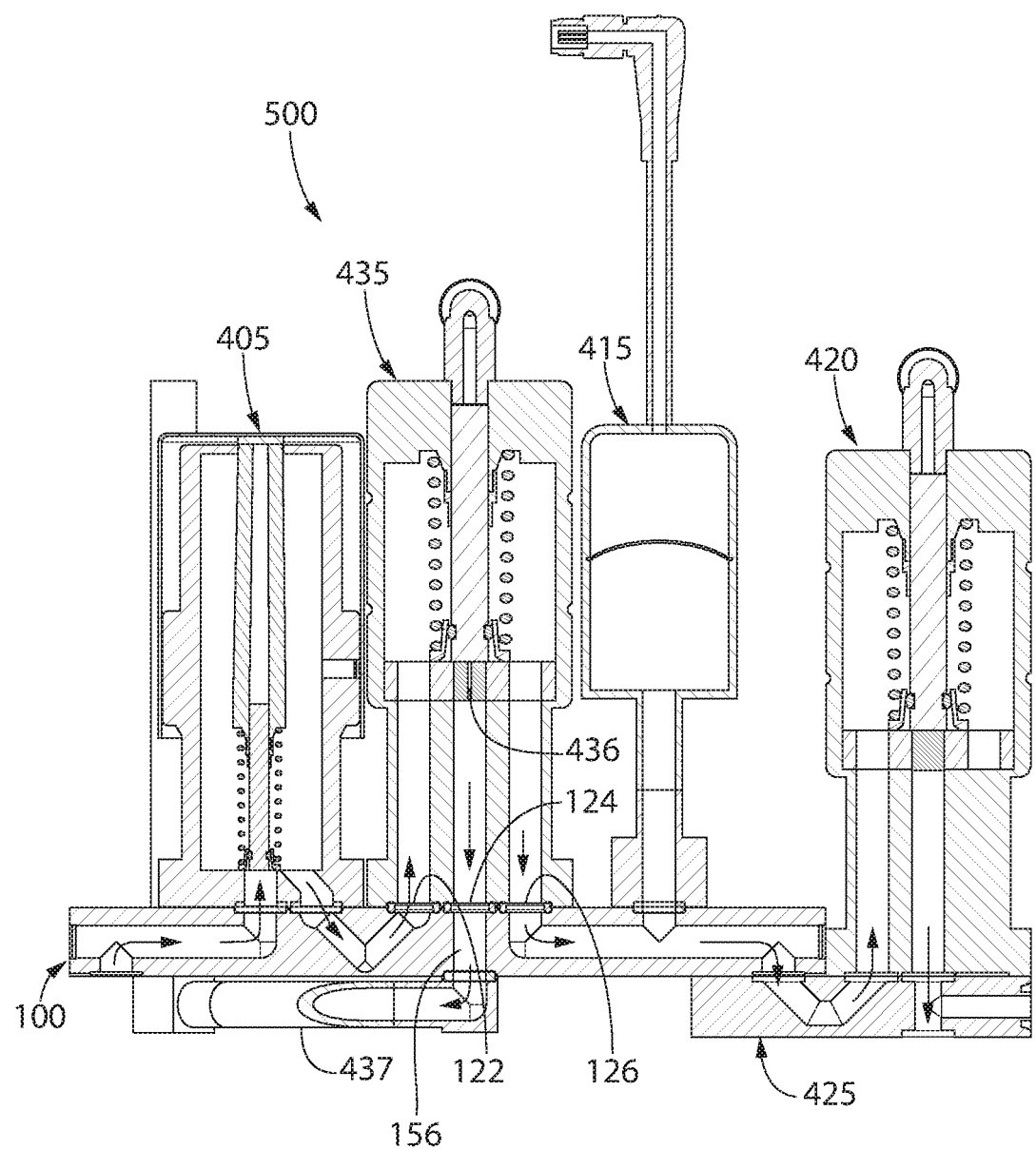
FIG. 14 is a cross sectional view of the mass flow controller of FIG. 13 illustrating the ports and flow passages.

Turning to FIGS. 13 and 14, a second embodiment of a mass flow controller 500 is shown. This mass flow controller is optimized for extremely low mass flow rates, and comprises a monolithic base 100, a control valve component 405, a bleed component 435, a pressure transducer component 415, a laminar flow component 420, and a substrate block 425. The control valve component 405, pressure transducer component 415, the laminar flow component 420, and the substrate block 425 are equivalent to those disclosed in the mass flow controller 300.

The bleed component 435 is mounted in the second component mounting region 120 and is operatively connected to the inlet port 122, outlet port 124, and auxiliary port 126. The bleed component 435 incorporates an orifice 436 which is sized to permit a desired amount of process gas to pass through the orifice 436 and the auxiliary port 126. The bleed component 435 also incorporates an on/off valve component to enable selective activation of the bleed functionality. The orifice 436 may be formed as one or more holes, a porous element, or any other means of providing a calibrated restriction to gas flow. When the bleed component 435 is activated, process gas is bled through the orifice 436 and passes into the auxiliary passage 156 to the bleed conduit 437. The bleed conduit 437 is directed to a process vacuum system for recovering and disposing of process gases. The bleed component 435 allows the mass flow controller 500 to have greatly increased accuracy and control at low mass flow rates where the control valve component 405 is unable to effectively control flow. Instead of exclusively relying on the control valve component 405 to meter process gas, the bleed component 435 allows additional control over the process gas which passes through the mass flow controller 500.

Figure 15:
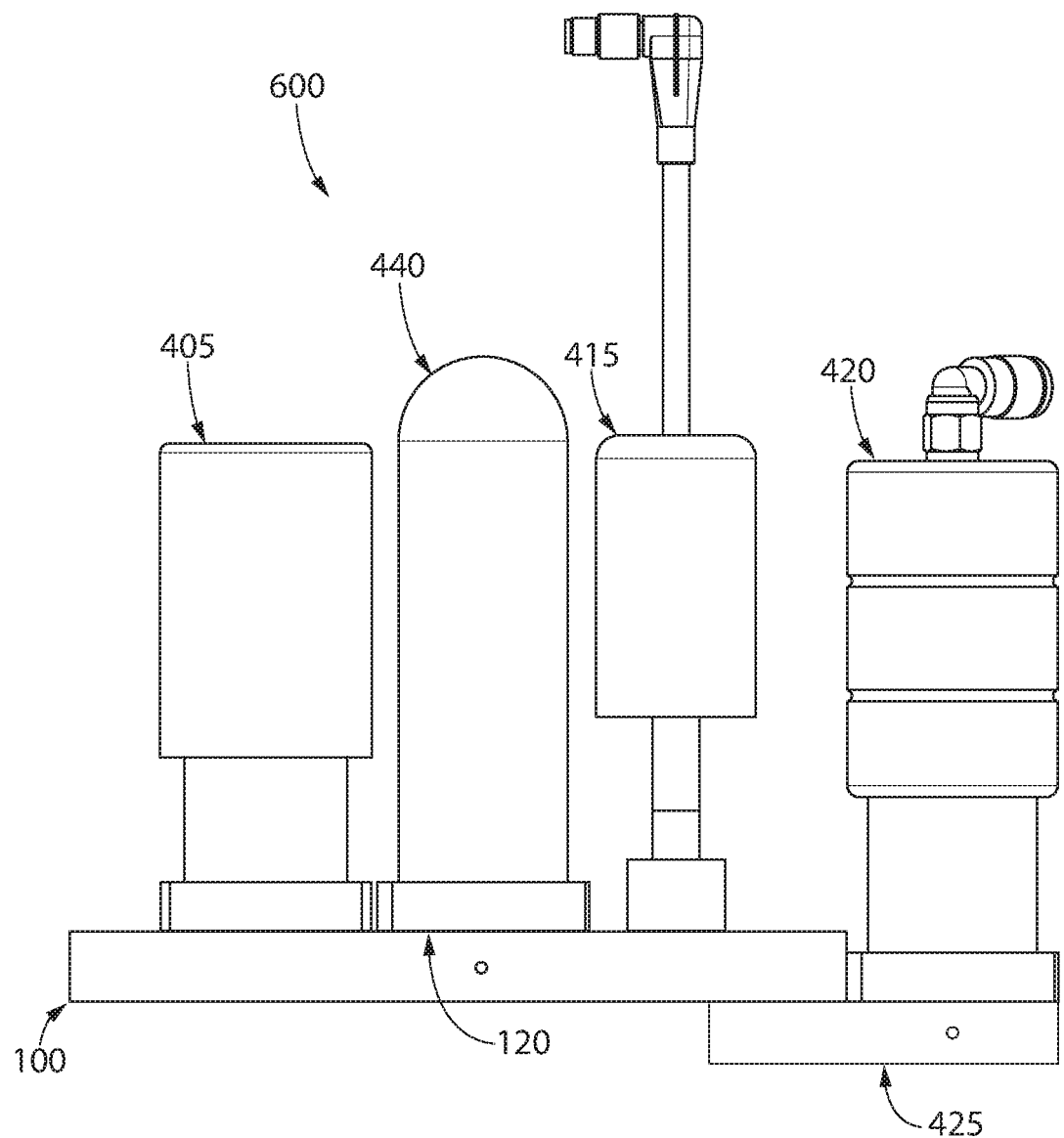
FIG. 15 is a side view of a mass flow controller in accordance with a third embodiment.
Figure 16:
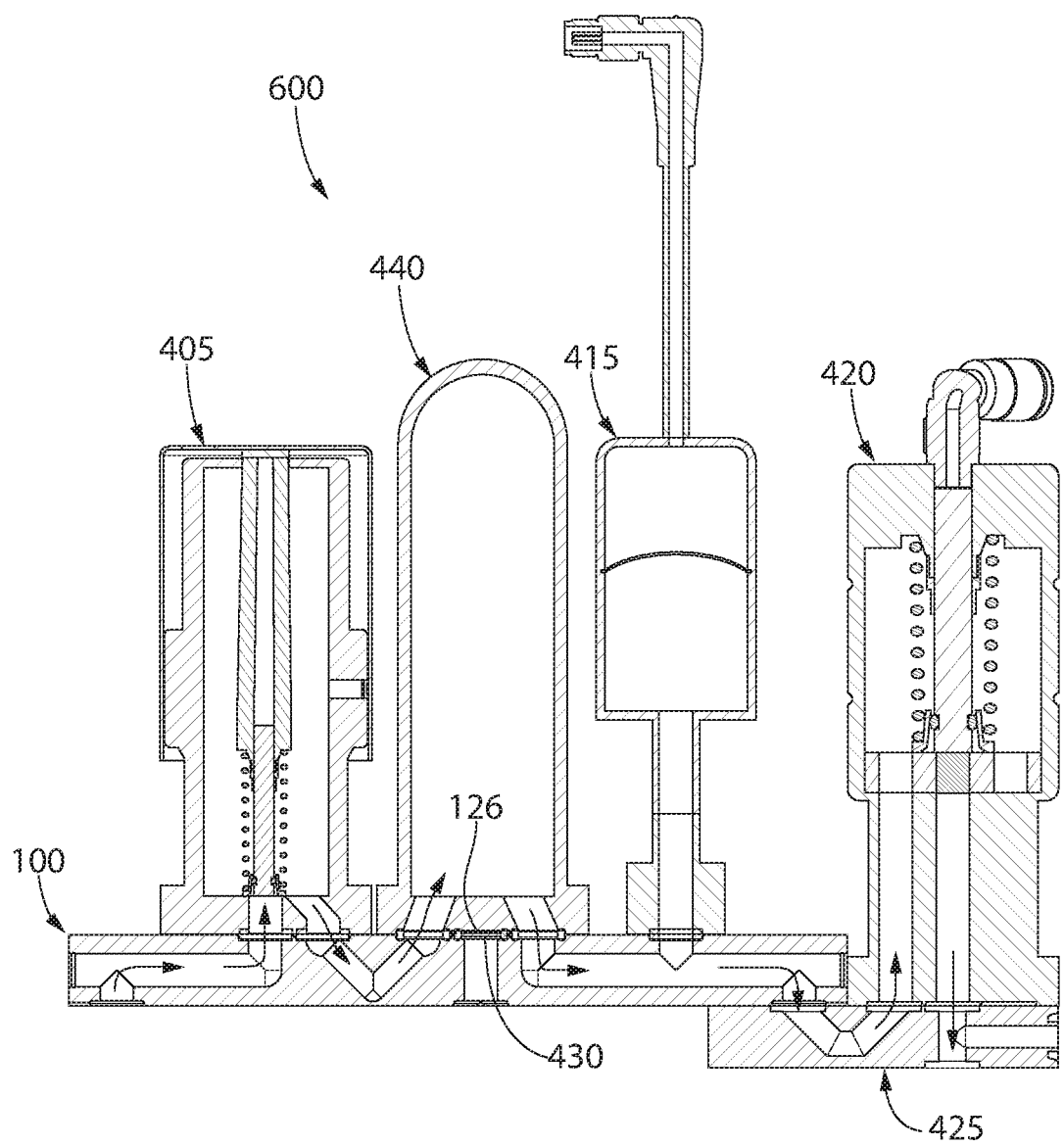
FIG. 16 is a cross sectional view of the mass flow controller of FIG. 15 illustrating the ports and flow passages.

The mass flow controller 600 of FIGS. 15 and 16 is designed to provide an exceptionally stable flow of process gas. This is accomplished by combining a monolithic base 100 with a control valve component 405, a volumetric expander component 440, a pressure transducer 415, a laminar flow component 420, and a substrate block 425. As with the mass flow controllers 300, 500 discussed above, the mass flow controller 600 incorporates the control valve component 405, pressure transducer 415, laminar flow component 420, and substrate block 425 and these components serve the same purpose. However, in place of the bleed component 435, the volumetric expander component 440 is fitted to provide a known volume to dampen pressure pulses in the process gas. The volumetric expander component 440 increases the stability of the mass flow rate. The auxiliary port 126 of the second flow component mounting region 120 is not connected to the volumetric expander component 440. Instead, a blocking seal 430 is provided on the auxiliary port 126 to ensure that no gas flow can occur.

Figure 17:
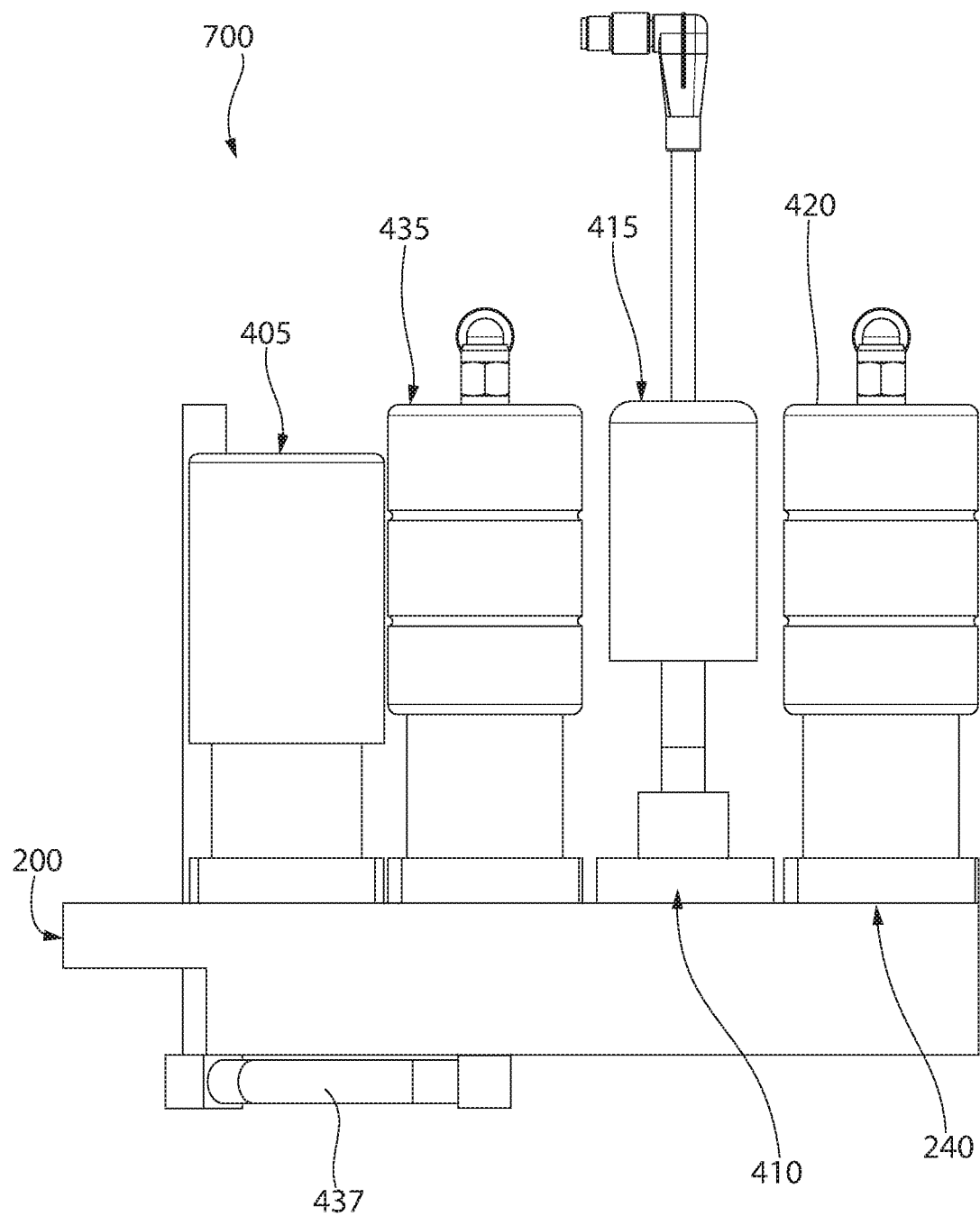
FIG. 17 is a side view of a mass flow controller in accordance with a fourth embodiment.
Figure 18:
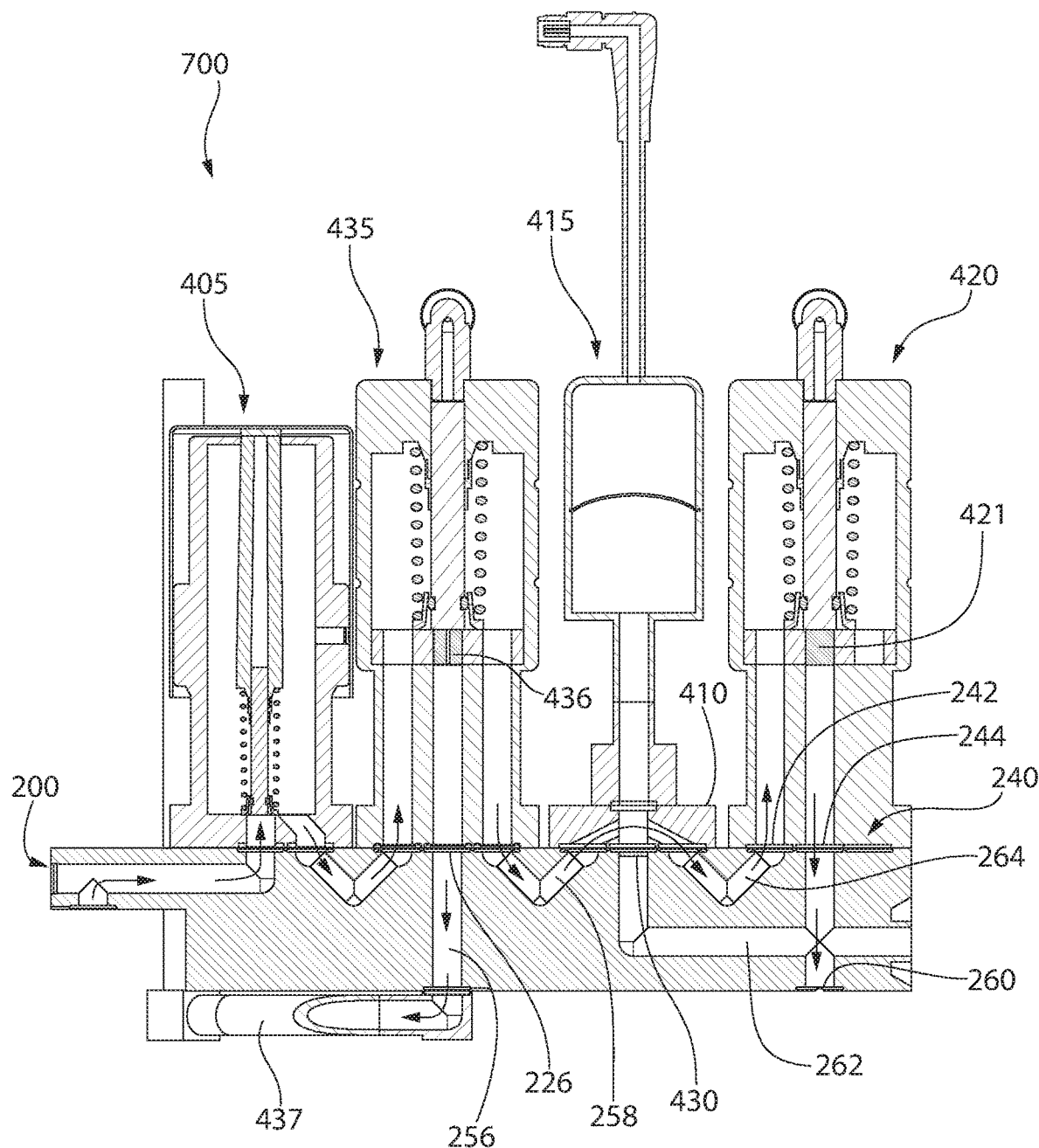
FIG. 18 is a cross sectional view of the mass flow controller of FIG. 17 illustrating the ports and flow passages.

FIGS. 17 and 18 illustrate a fourth embodiment of the mass flow controller 700. The mass flow controller 700 incorporates a monolithic base 200, a control valve component 405, a bleed component 435, a pressure transducer component 415, a cap component 410, and a laminar flow component 420. The mass flow controller 700 is similar to that disclosed in FIGS. 13 and 14, but differs in that the substrate block 425 has been eliminated and its features incorporated into the monolithic base 200. The mass flow controller 700 offers the same advantages in low flow accuracy with a different monolithic base. The process gas flows through the control valve component 405 as before, then passes through the bleed component 435 with a portion of the process gas being allowed to bleed through the orifice 436, through the auxiliary port 226 of the second flow component mounting region 120, and on through the auxiliary passage 156 to the bleed conduit 437.

The remaining process gas passes through the third flow passage 258 to the inlet port 232 of the third flow component mounting region 230. The cap component 410 is coupled to the third flow component mounting region 230 and has a passage which connects inlet port 232 to the auxiliary port 236, allowing unrestricted gas flow from the third flow passage to the fifth flow passage 264. The outlet port 234 is plugged by a blocking seal 430 so that the fourth flow passage 262 is isolated from the third and fifth flow passages 258, 264. The pressure transducer component 415 is mounted to the cap component 410 so that it can measure the pressure of the process gas within the third and fifth flow passages 258, 264.

Downstream of the cap component 410 and the pressure transducer component 415, process gas flows through the laminar flow component 420 coupled to the fourth flow component mounting region 240. Process gas enters the laminar flow component 420 at the inlet port 242, flows through the restrictor 421, and out of the laminar flow component 420 through the outlet port 244. The process gas is then conducted by the fourth flow passage 262 to the gas outlet 260.

Figure 19:
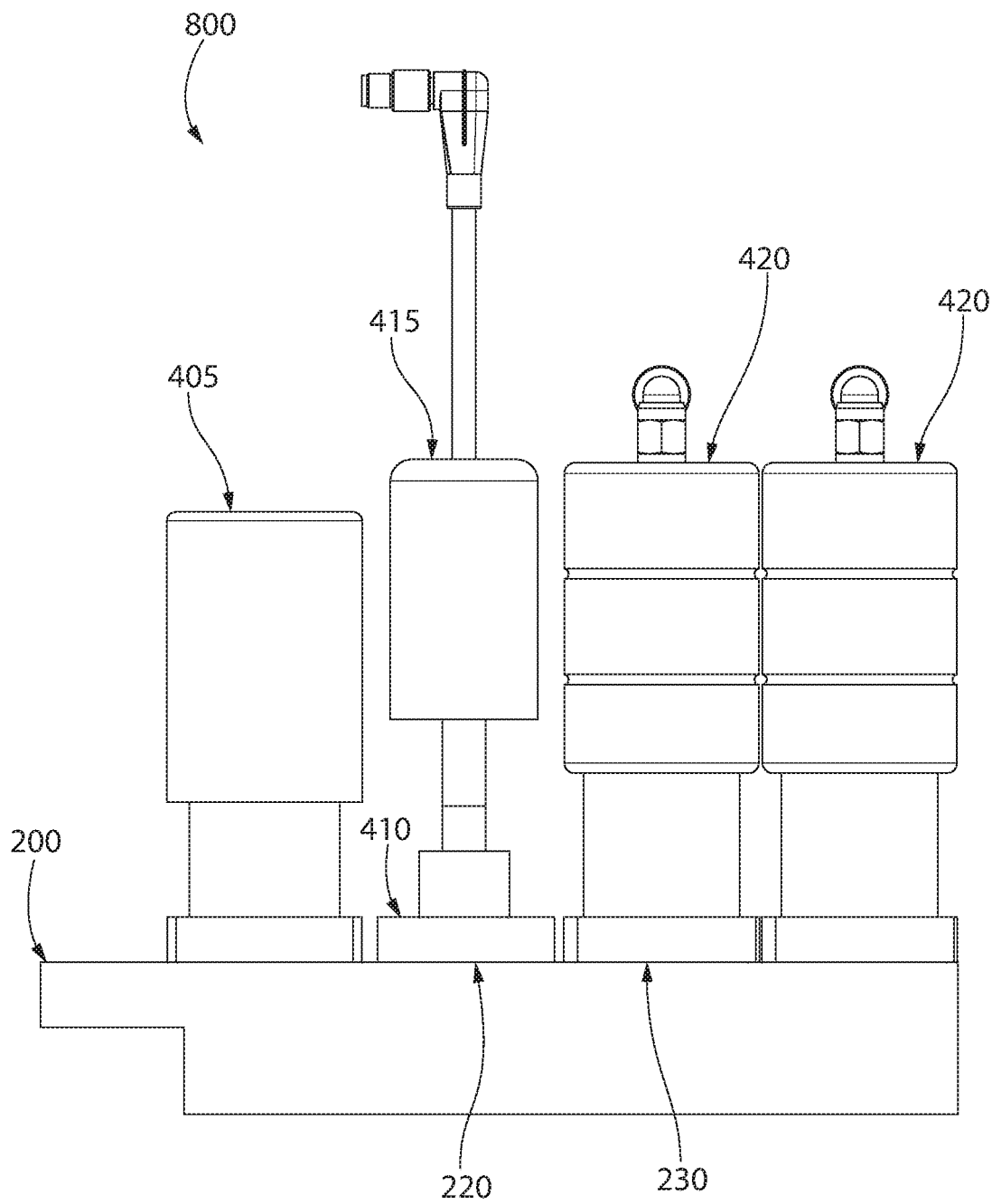
FIG. 19 is a side view of a mass flow controller in accordance with a fifth embodiment.
Figure 20:
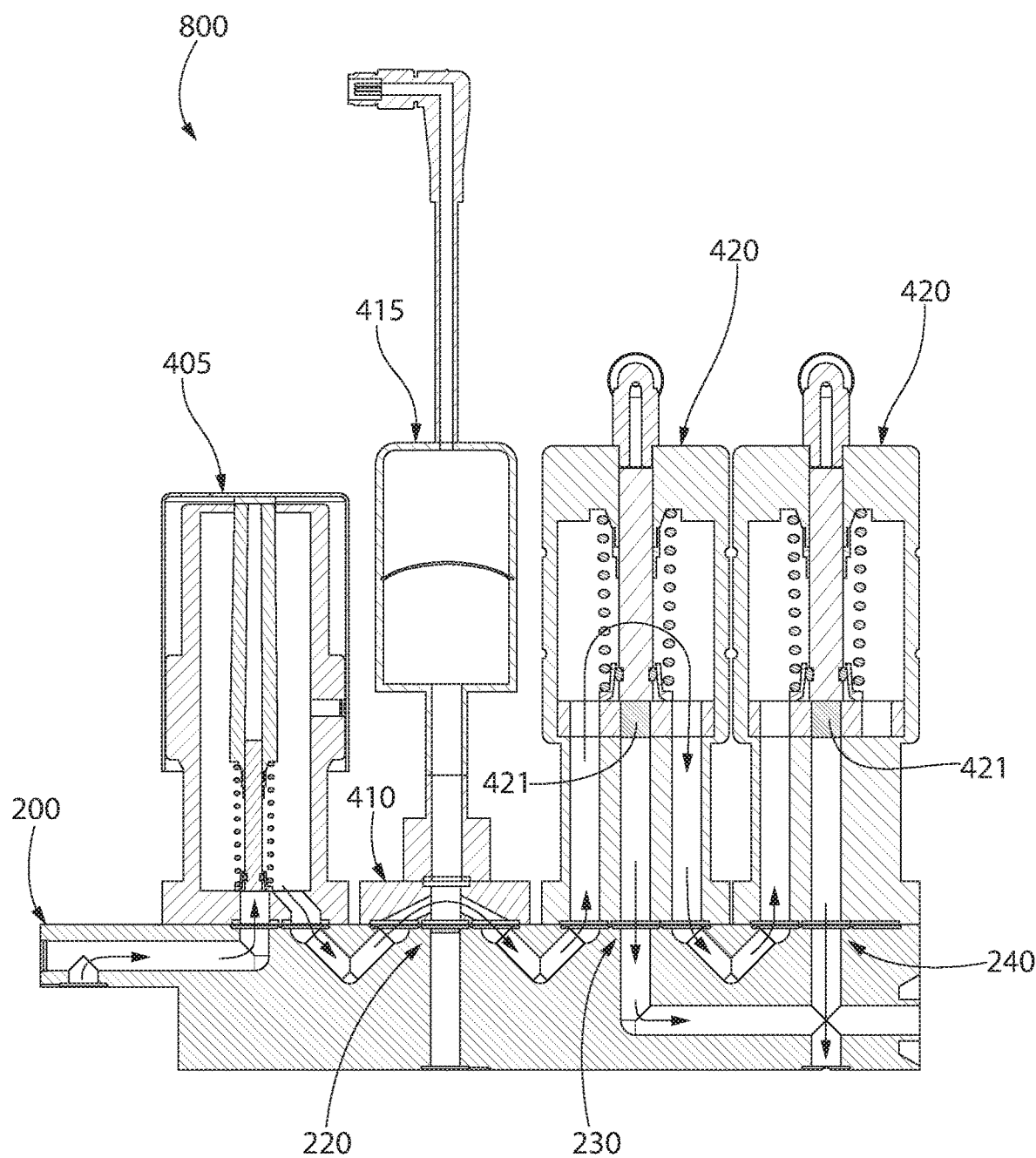
FIG. 20 is a cross sectional view of the mass flow controller of FIG. 19 illustrating the ports and flow passages.

A mass flow controller 800 exhibiting a broad dynamic range of possible mass flow rates is shown in FIGS. 19 and 20. The mass flow controller 800 incorporates a monolithic base 200, a control valve component 405, a pressure transducer component 415, a cap component 410, and two laminar flow components 420. By sizing the restrictors 421 in the laminar flow components 420, a large dynamic range can be achieved. Selectively enabling the laminar flow component 420 having the appropriate restrictor 421 for the desired mass flow rate allows a single mass flow controller to serve in the place of two individual mass flow controllers having different ranges of mass flow rates, achieving a considerable cost savings.

The mass flow controller 800 positions the cap component 410 and the pressure transducer component 415 in the second flow component mounting location 220. The auxiliary port 226 of the second flow component mounting location 220 is blocked by a blocking seal 430 which prevents process gas from exiting through the auxiliary port 226. The first laminar flow component 420 is coupled to the third flow component mounting location 230. The second laminar flow component 420 is coupled to the fourth flow component mounting location 240. Both laminar flow components 420 incorporate internal on/off valve components to permit selective engagement of one or both of the laminar flow components 420. As can be seen, it is possible to reconfigure the component locations to permit the same components to be mounted in different flow component mounting regions as a result of the port and passage configurations. The second, third, and fourth flow component mounting regions 220, 230, 240 are multi-function flow component mounting regions that enable flexible arrangement of the components as shown in the mass flow controller 800. This greatly increases the functionality of the monolithic base 200 and does not require separate customized base designs.

Figure 21:
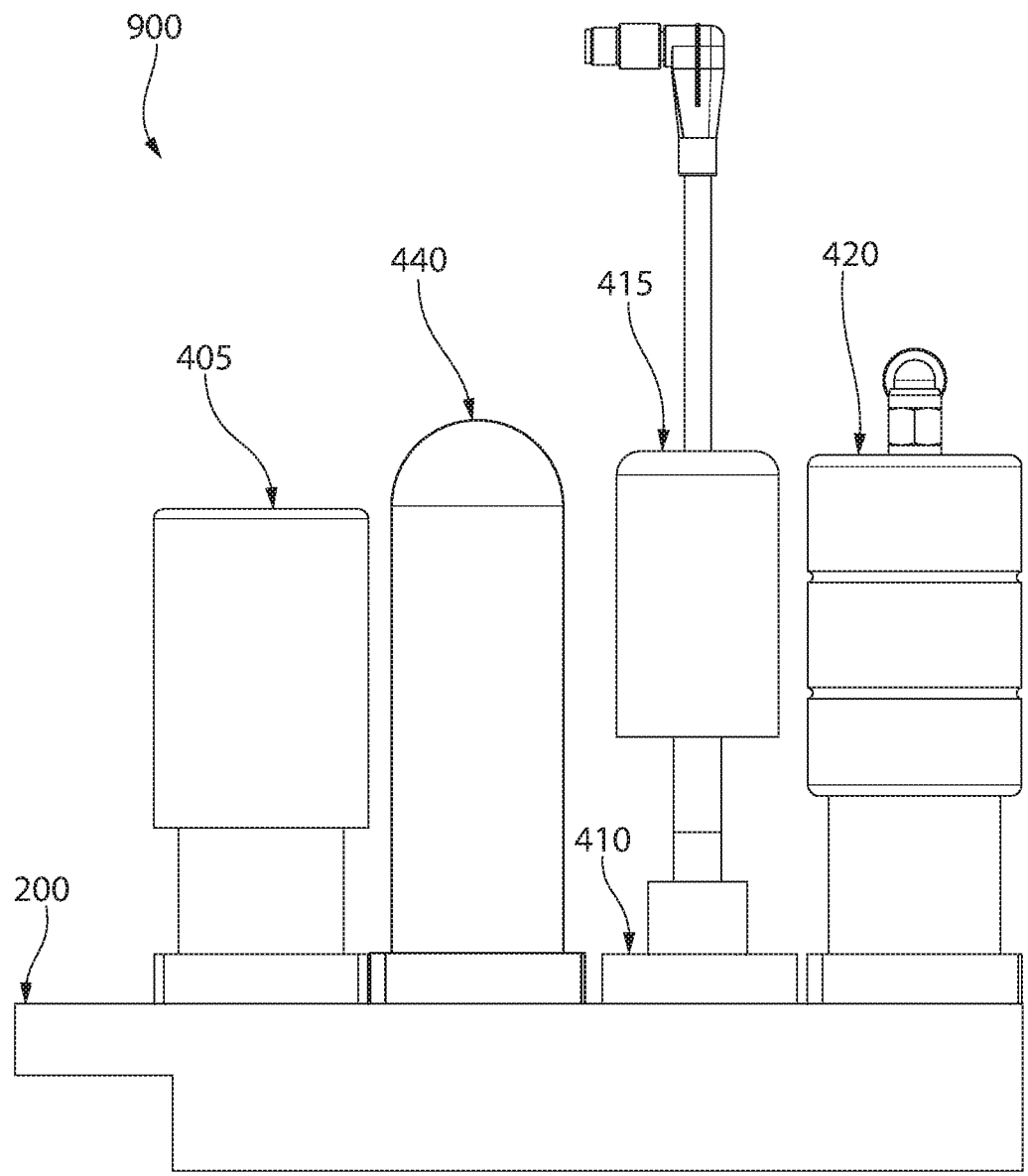
FIG. 21 is a side view of a mass flow controller in accordance with a sixth embodiment.
Figure 22:
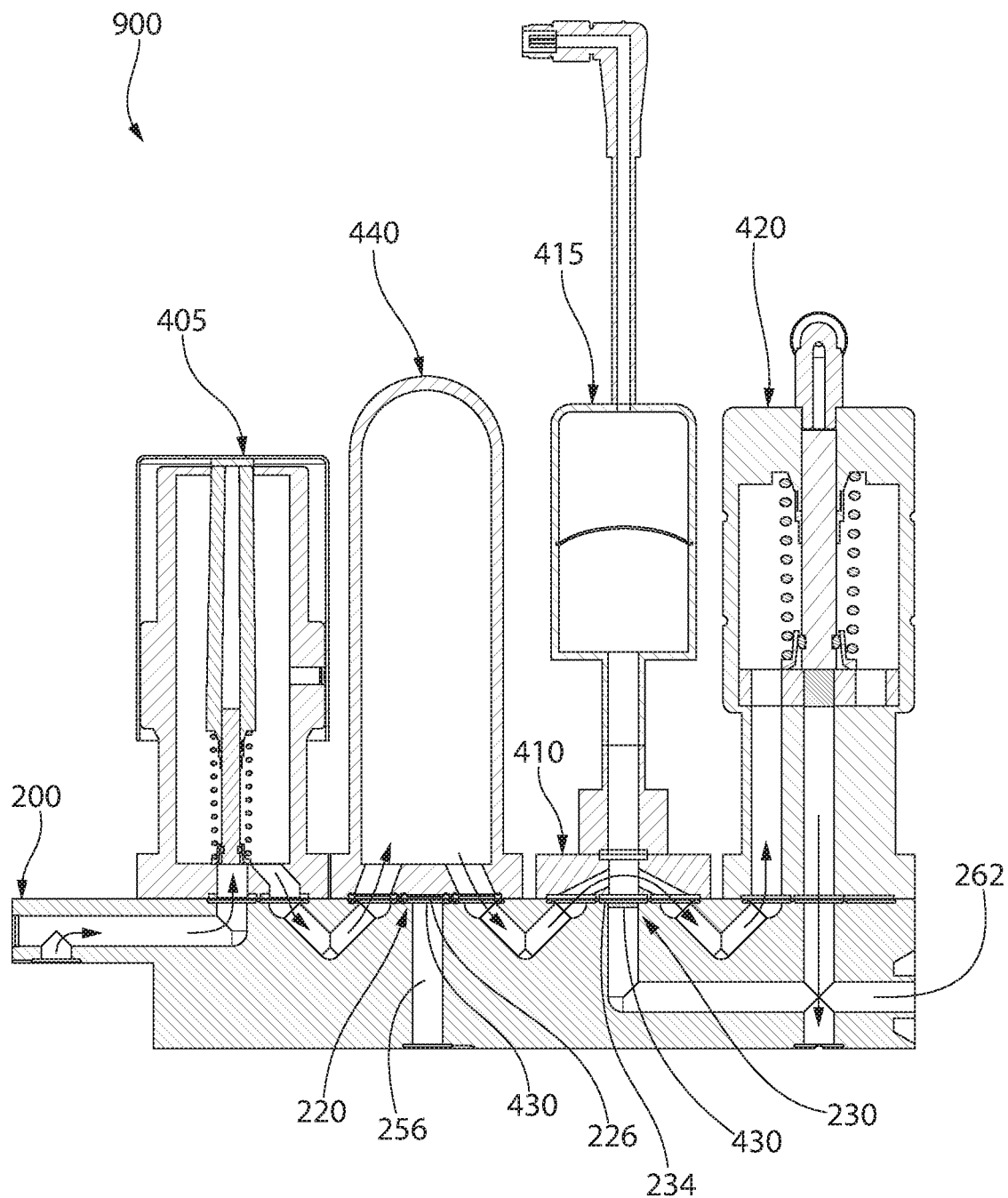
FIG. 22 is a cross sectional view of the mass flow controller of FIG. 21 illustrating the ports and flow passages.

The mass flow controller 900 of FIGS. 21 and 22 is another implementation of the high stability device disclosed in FIGS. 15 and 16. In this embodiment, a control valve component 405, a volumetric expander component 440, a pressure transducer component 415, a cap component 410, and a laminar flow component 420 are coupled to a monolithic base 200. The volumetric expander component 440 is coupled to the second flow component mounting location 220 and the pressure transducer component 415 and cap component 410 are coupled to the third flow component mounting location 230. The auxiliary port 226 of the second flow component mounting location 220 and the outlet port 234 of the third flow component mounting location 230 are blocked with blocking seals 430. Thus, no process gas flows through the auxiliary passage 256. The fourth flow passage 262 is also blocked, except for process gas that flows through the laminar flow component 420.

Figure 23:
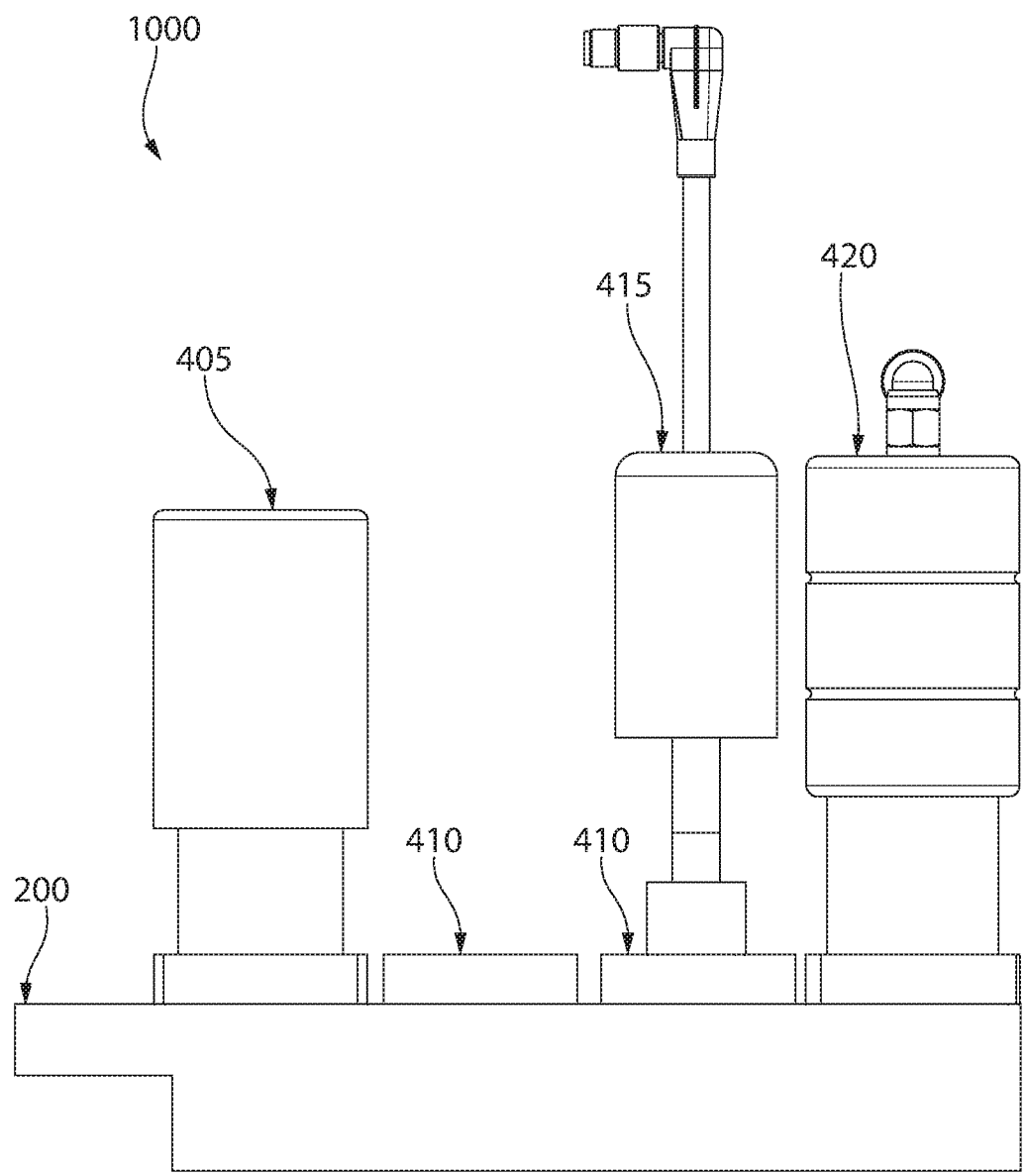
FIG. 23 is a side view of a mass flow controller in accordance with a seventh embodiment.
Figure 24:
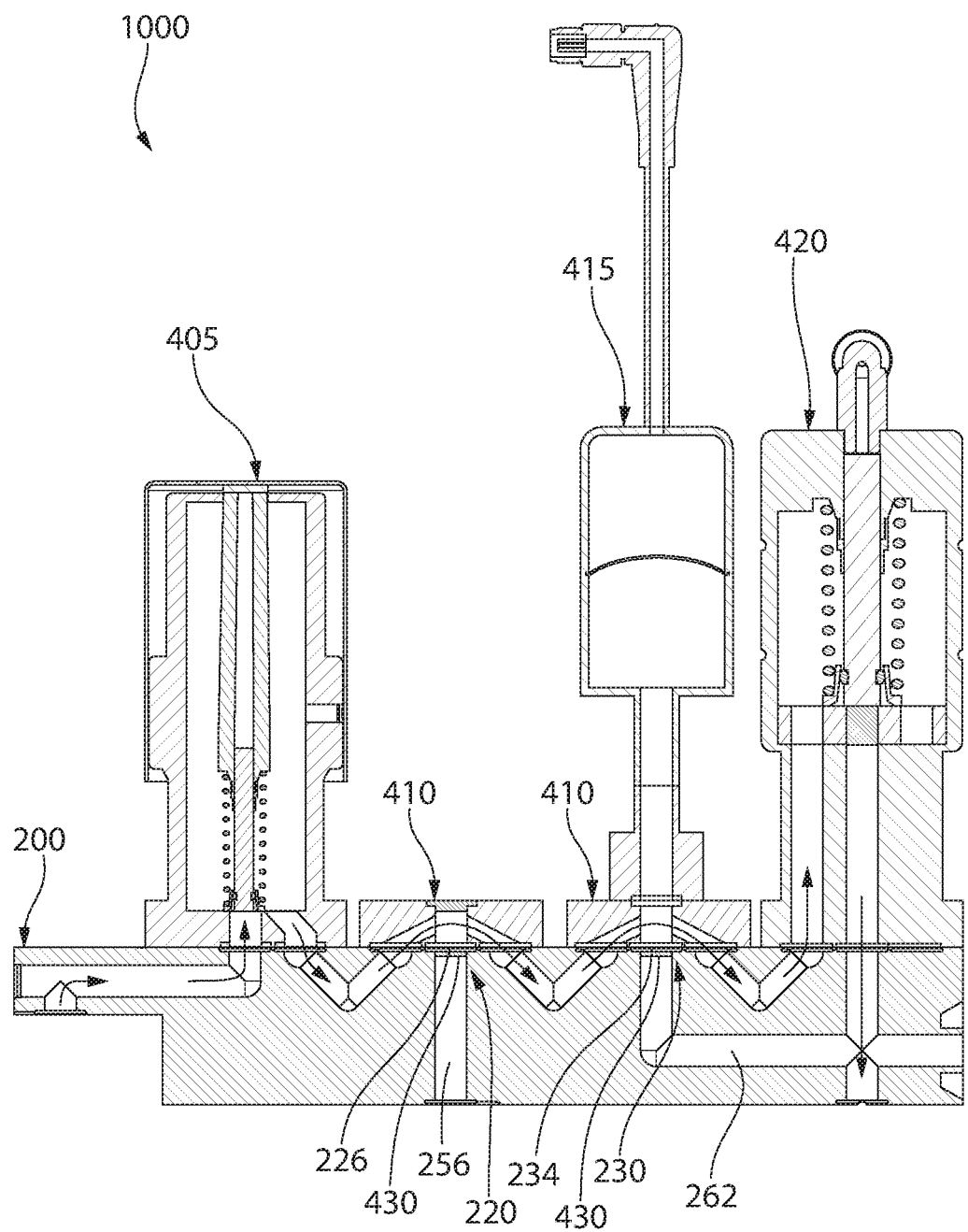
FIG. 24 is a cross sectional view of the mass flow controller of FIG. 23 illustrating the ports and flow passages.

Turning to FIGS. 23 and 24, a seventh embodiment of the mass flow controller 1000 is disclosed. This embodiment is designed to be a standard mass flow controller with no additional special functionality. The mass flow controller 1000 has a monolithic base 200, a control valve component 405, two cap components 410, a pressure transducer component 415, and a laminar flow component 420. The first cap component 410 is coupled to the second flow component mounting region 220 and the upper port on the first cap component 410 is plugged because there is no pressure transducer component 415 installed on the first cap component 410. The auxiliary port 226 of the second flow component mounting region 220 is blocked by a blocking seal 430 to prevent flow into the auxiliary passage 256.

The second cap component 410 is coupled to the third flow component mounting region 230 and the pressure transducer component 415 is attached to the second cap component 410. This enables the pressure transducer component 415 to sample the pressure upstream of the laminar flow component 420. In this embodiment, the outlet port 234 of the third flow component mounting region 230 is blocked by a blocking seal 430 to prevent flow upstream of the laminar flow component 420 from entering the fourth flow passage 262 without first passing through the laminar flow component 420. It is possible that the pressure transducer component 415 could be mounted to the first cap block 410 instead of the second cap block 410 if so desired, as the pressure in the internal passages of each of the first and second cap blocks 410 is equal.

Other mass flow controllers may be assembled with yet further variations in flow components. For example, it is within the scope of the invention to incorporate the features of one or more of the individual components into a single combination component. Specifically, a hybrid control valve component and pressure transducer component may be created which simultaneously controls process gas flow into the mass flow controller while simultaneously measuring the pressure of the gas downstream of the valve. This may free up additional flow component mounting locations for a more compact installation or the inclusion of additional flow components.

The monolithic bases 100, 200 may be used in a variety of installations in a substantially identical configuration. Monolithic bases are considered to be substantially identical even though particular blocks may vary due to minor imperfections, normal manufacturing tolerances, variations in flow component mounting arrangements, etc. Monolithic bases are also considered substantially identical where they have the same port arrangement and flow passage arrangement, even though the exact dimensions of the flow ports may vary. Where the bases have different port and passage variations, they are not deemed to be substantially identical.

Mass flow controller operating characteristics typically include maximum mass flow rate, minimum mass flow rate, mass flow rate supply accuracy, dynamic operating range, startup response time, and shut-off response time. As noted above, a variety of configurations of flow components can achieve different operating characteristics. Though altering the restrictor in a laminar flow component can achieve different ranges of maximum and minimum flow rates, the dynamic operating range is limited when a single laminar flow component is used. Thus, it is often advantageous to add a second laminar flow component having a different restrictor to increase the dynamic operating range. In yet other embodiments, more than two laminar flow components may be added to further enhance the dynamic operating range.

In other embodiments, it may be desirable to change the flow components to incorporate more pressure transducers, different components such as bleed components or volumetric expanders, or yet other flow components. Thus, a wide range of types of flow components may be incorporated into a single mass flow controller. Alternately, the flow components may be differently mounted on the same monolithic base to provide a variety of configurations.

Furthermore, temperature sensor components may be incorporated into the monolithic base, the control valve component, or any of the other components within the system. This enables an electronic control element to compensate for the temperature of the process gas and further enhance system accuracy. The electronic control element operates the valves and measures temperature and pressure to obtain the desired mass flow rates. The electronic control element is also capable of networked communication with other electronic devices in the system, so that it can send and receive data such as pressures in a process manifold downstream from the mass flow controller or instructions to start, stop, or alter the commanded mass flow rate. The electronic control element also stores all system calibration data to ensure that parameters such as the characterization data of the restrictor(s) in the laminar flow components.

Dynamic operating ranges for mass flow controllers having a single laminar flow component may be in the range of 20:1. Dynamic operating ranges for mass flow controllers having two laminar flow components may be as high as 400:1. Dynamic operating ranges for mass flow controllers having three laminar flow components may be as high as 8000:1. Each additional laminar flow component can increase the dynamic operating range by 20 times when the restrictors are selected appropriately.

Furthermore, achieving the desired mass flow rate supply accuracy can require additional flow components. Though a mass flow controller incorporating a single laminar flow component may have a high accuracy within a portion of the dynamic operating range, its accuracy may not be constant throughout the dynamic operating range. Accuracy may be enhanced by incorporating multiple laminar flow components or other flow components. Target mass flow rate supply accuracy may be 1%, 0.9%, or 0.5%.

The startup and shut-off response time of the unit is also affected by the volume between the control valve component and the one or more laminar flow components. Thus, if extremely fast response times are required, it may be necessary to minimize this volume. Alternately, if high stability is desired, a larger volume may be desirable to dampen pulses in the supplied mass flow rate. The volume may be altered to achieve a desired stability. The stability of the mass flow rate may be measured as a peak percent error from the desired mass flow rate. Target stability may be 1%, 0.8%, 0.5%, or even 0.25%.

Finally, the incorporation of bleed components may provide higher accuracy at extremely low flow rates. The bleed component may be constructed similarly to a laminar flow component with a different orifice or restrictor provided, and it may or may not incorporate a valve to control the opening of the orifice or restrictor.

The present invention may also be a process for manufacturing semiconductor devices incorporating a mass flow controller. This process may incorporate any system where a mass flow controller is connected to a gas supply and a controlled mass flow rate of a process gas is delivered to the process. Some representative semiconductor processes may include deposition, removal, patterning, or modification of electrical properties. Deposition processes may include physical vapor deposition, chemical vapor deposition, electrochemical deposition, molecular beam epitaxy, and atomic later deposition. Removal may include wet or dry etching and chemical-mechanical planarization. Patterning includes lithography processes which may incorporate deposition of photoresist and plasma ashing. Modification of electrical properties may include processes for doping by diffusion or ion implantation, or annealing by furnace annealing or rapid thermal annealing. The invention may include equipment for processing semiconductor devices through any process requiring controlled gas flow.

The present invention may also be a process for allowing a customer to specify and construct a mass flow system integrating off the shelf components into the customer's semiconductor manufacturing equipment. Furthermore, additional components may be purchased so as to enable reconfiguration of existing equipment at lower cost, rather than purchasing a new mass flow controller or mass flow control system for a new application. Individual components may be substituted or reconfigured to achieve different control objectives.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A mass flow control apparatus comprising:
   a monolithic base, the monolithic base comprising a gas inlet, a gas outlet, a first flow component mounting region, a second flow component mounting region, and a third flow component mounting region;
   wherein the first flow component mounting region comprises a first inlet port and a first outlet port, the first inlet port fluidly coupled to the gas inlet of the monolithic base; and
   wherein the second flow component mounting region comprises a second inlet port, a second outlet port, and a first auxiliary port.

2. The mass flow control apparatus of claim 1 wherein the third flow component mounting region comprises a first sensing port, the first sensing port and the second outlet port fluidly coupled to the gas outlet of the monolithic base.

3. The mass flow control apparatus of claim 1 wherein the first outlet port is fluidly coupled to the second inlet port.

4. The mass flow control apparatus of claim 1 wherein the third flow component mounting region comprises a third inlet port, a third outlet port, and a second auxiliary port.

5. The mass flow control apparatus of claim 1 further comprising a fourth flow component mounting region.

6. The mass flow control apparatus of claim 5 wherein the fourth flow component mounting region comprises a fourth inlet port and a fourth outlet port, the third outlet port and the fourth outlet port being connected to the gas outlet of the monolithic base.

7. The mass flow control apparatus of claim 1 further comprising a proportional valve coupled to the first flow component mounting region and a cap component coupled to the second flow component mounting region, the cap component having a passage connecting the second inlet port to the second outlet port.

8. The mass flow control apparatus of claim 1 further comprising a cap component coupled to the second flow component mounting region.

9. The mass flow control apparatus of claim 1 further comprising a first valve coupled to the first flow component mounting region and a second valve coupled to the second flow component mounting region, the second valve fluidly coupled to the second inlet port and the second outlet port and blocking the first auxiliary port.

10. The mass flow control apparatus of claim 9 wherein the second valve is fluidly coupled to the first auxiliary port of the second flow component mounting region.

11. A mass flow control apparatus comprising:
    a monolithic base, the monolithic base comprising a gas inlet, a gas outlet, a first flow component mounting region, a second flow component mounting region, and a third flow component mounting region;
    a first valve coupled to the first flow component mounting region; and
    a cap component coupled to one of the second flow component mounting region or the third flow component mounting region;
    wherein the first flow component mounting region comprises a first inlet port and a first outlet port, the first inlet port fluidly coupled to the gas inlet of the monolithic base; and
    wherein the second flow component mounting region comprises a second inlet port, a second outlet port, and a first auxiliary port.

12. The mass flow control apparatus of claim 11 further comprising a second valve fluidly coupled to the third flow component mounting region.

13. The mass flow control apparatus of claim 12 wherein the second valve comprises a laminar flow component.

14. The mass flow control apparatus of claim 11 wherein the cap component has a passage which fluidly couples the second inlet port and the second outlet port.

15. The mass flow control apparatus of claim 11 wherein the cap component has a passage which fluidly couples the second inlet port and the second outlet port.

16. The mass flow control apparatus of claim 11 wherein the cap component blocks flow through the first auxiliary port.

17. A mass flow control apparatus comprising:
    a monolithic base, the monolithic base comprising a gas inlet, a gas outlet, a first flow component mounting region, a second flow component mounting region, and a third flow component mounting region;
    a first valve coupled to the first flow component mounting region;
    a second valve coupled to the second flow component mounting region;
    a third valve coupled to the third flow component mounting region;
    wherein the first flow component mounting region comprises a first inlet port fluidly coupled to the gas inlet of the monolithic base;
    wherein the second flow component mounting region comprises a first auxiliary port; and
    wherein the third valve is fluidly coupled to the gas outlet of the monolithic base.

18. The mass flow control apparatus of claim 17 wherein the first valve is a proportional valve.

19. The mass flow control apparatus of claim 17 wherein the second and third valves further comprise laminar flow components.

20. The mass flow control apparatus of claim 17 wherein the second valve is fluidly coupled to the first auxiliary port.

* * * * *